(12) United States Patent
Iwata et al.

(10) Patent No.: US 10,109,857 B2
(45) Date of Patent: Oct. 23, 2018

(54) METAL-CONTAINING TRIMANGANESE TETRAOXIDE COMPOSITE PARTICLES AND METHOD FOR PRODUCING SAME

(71) Applicant: TOSOH CORPORATION, Yamaguchi (JP)

(72) Inventors: Eiichi Iwata, Yamaguchi (JP); Miki Yamashita, Yamaguchi (JP); Yasuhiro Fujii, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 189 days.

(21) Appl. No.: 14/389,536

(22) PCT Filed: Mar. 29, 2013

(86) PCT No.: PCT/JP2013/059675
§ 371 (c)(1),
(2) Date: Sep. 30, 2014

(87) PCT Pub. No.: WO2013/150987
PCT Pub. Date: Oct. 10, 2013

(65) Prior Publication Data
US 2015/0104644 A1    Apr. 16, 2015

(30) Foreign Application Priority Data

Apr. 5, 2012 (JP) .................................. 2012-086903
Apr. 5, 2012 (JP) .................................. 2012-086904
(Continued)

(51) Int. Cl.
*C01G 45/02* (2006.01)
*H01M 4/505* (2010.01)
(Continued)

(52) U.S. Cl.
CPC ............ *H01M 4/505* (2013.01); *C01G 45/00* (2013.01); *C01G 45/02* (2013.01);
(Continued)

(58) Field of Classification Search
CPC ....................................................... C01G 45/02
(Continued)

(56) References Cited

U.S. PATENT DOCUMENTS 3,767,780 A    10/1973   Bellas et al.
5,807,646 A *  9/1998    Iwata ................. C01G 45/1242
                                                      264/603
(Continued)

FOREIGN PATENT DOCUMENTS

EP    2157640    2/2010
EP    2214233    8/2010
(Continued)

OTHER PUBLICATIONS

Manigandan et al., Manganese sesquioxide to trimanganese tetroxide hierarchical hollow nanostructures: effect of gadolinium on structural, thermal, optical and magnetic properties, Cryst. Eng. Comm., 2015, 17, 2886.*

(Continued)

*Primary Examiner* — Hoa (Holly) Le
(74) *Attorney, Agent, or Firm* — Greenblum & Bernstein, P.L.C.

(57) ABSTRACT

To provide metal-containing trimanganese tetraoxide combined particles with which a metal-substituted lithium manganese oxide excellent as a cathode material for a lithium secondary battery can be obtained, and their production process.

Metal-containing trimanganese tetraoxide combined particles containing a metal element (excluding lithium and manganese). Such metal-containing trimanganese tetraoxide (Continued)

combined particles can be obtained by a production process comprising a crystallization step of crystallizing a metal-substituted trimanganese tetraoxide not by means of metal-substituted manganese hydroxide from a manganese salt aqueous solution containing manganese ions and metal ions other than manganese.

19 Claims, 10 Drawing Sheets

(30) Foreign Application Priority Data

Apr. 5, 2012 (JP) .................. 2012-086905
Apr. 5, 2012 (JP) .................. 2012-086906

(51) Int. Cl.
C01G 45/00 (2006.01)
H01M 4/525 (2010.01)
C01G 45/12 (2006.01)
C01G 53/00 (2006.01)
C25B 1/21 (2006.01)

(52) U.S. Cl.
CPC ..... C01G 45/1214 (2013.01); C01G 45/1242 (2013.01); C01G 53/50 (2013.01); C25B 1/21 (2013.01); H01M 4/525 (2013.01); C01P 2002/32 (2013.01); C01P 2002/72 (2013.01); C01P 2002/76 (2013.01); C01P 2004/03 (2013.01); C01P 2004/45 (2013.01); C01P 2004/52 (2013.01); C01P 2004/53 (2013.01); C01P 2004/61 (2013.01); C01P 2006/11 (2013.01); C01P 2006/12 (2013.01); C01P 2006/40 (2013.01); Y10T 428/2982 (2015.01)

(58) Field of Classification Search
USPC .................. 423/599, 600, 605, 635
See application file for complete search history.

(56) References Cited

U.S. PATENT DOCUMENTS

| | | | | |
|---|---|---|---|---|
| 6,168,888 B1* | 1/2001 | Iwata | ............... | C01G 45/1242 252/182.1 |
| 6,428,766 B1 | 8/2002 | Fujino et al. | | |
| 9,163,328 B2* | 10/2015 | Jiang | ............... | C01G 45/00 |
| 2002/0177002 A1 | 11/2002 | Fujino et al. | | |
| 2002/0197202 A1 | 12/2002 | Fujino et al. | | |
| 2004/0011252 A1* | 1/2004 | Sturgill | ............ | C01G 45/1221 106/401 |
| 2010/0207059 A1 | 8/2010 | Uegami et al. | | |
| 2010/0288969 A1* | 11/2010 | Koga | .............. | C01G 45/1242 252/182.1 |
| 2010/0316910 A1 | 12/2010 | Kajiyama et al. | | |
| 2010/0327221 A1 | 12/2010 | Koga et al. | | |
| 2011/0297876 A1* | 12/2011 | Masukuni | ........ | C01G 45/1242 252/182.1 |
| 2014/0034872 A1 | 2/2014 | Watanabe et al. | | |
| 2015/0266748 A1* | 9/2015 | Suzuki | ............ | C01G 45/02 423/605 |

FOREIGN PATENT DOCUMENTS

| | | |
|---|---|---|
| JP | 8-37007 | 2/1996 |
| JP | 10-203826 | 8/1998 |
| JP | 11-171551 | 6/1999 |
| JP | 2000-128540 | 5/2000 |
| JP | 2001-261343 | 9/2001 |
| JP | 2001-307724 | 11/2001 |
| JP | 2002-201028 | 7/2002 |
| JP | 2003-123756 | 4/2003 |
| JP | 2005-289720 | 10/2005 |
| JP | 2008-251390 | 10/2008 |
| JP | 2009-176732 | 8/2009 |
| JP | 2010-114088 | 5/2010 |
| JP | 2010-137996 | 6/2010 |
| JP | 2011-105565 | 6/2011 |
| JP | 2011-105594 | 6/2011 |
| JP | 2012-188341 | 10/2012 |
| JP | 2012-216547 | 11/2012 |
| KR | 10-2011-0111056 | 10/2011 |
| WO | 2008/018633 | 2/2008 |

OTHER PUBLICATIONS

Translation JP 2003-123756 A (Apr. 2003).*
Google translated KR 10-2011-0111056 (2011).*
Google translated JP 2010-137996 (2010).*
Extended European Search Report issued in Patent Application No. 13772440.7, dated Nov. 27, 2015.
Elisabetta Finocchio et al., "Characterization and hyrocarbon oxidation activity of coprecipitated mixed oxides $Mn3O_4/Al_2O_3$", Caralysis Today, Dec. 31, 2001, pp. 2013-2225.
Chinese Office Action issued in Patent Appl. No. 201380018615.0, dated Mar. 25, 2016, and English language translation thereof.
Pattanayak et al., "Preparation and hermal stability of manganese oxides obtained by precipitation from aqueous manganese Sulphate Solution", Thermochimica Acta, Nov. 1, 1989, pp. 193-204, vol. 153.
Nakamura, Y. et al., "Structure and Magnetic Properties of Quenched (MnxAll-x)3O4 Spinels and Hausmannites", IEEE Transactions on Magnetics, Nov. 1995, pp. 4154-4156, vol. 31, No. 6.
Azad, A.M. et al., "Examining the Cu—Mn—O Spinel System as an Oxygen Carrier in Chemical Looping Combustion", Energy Technology, Jan. 16, 2013, pp. 59-69, vol. 1, No. 1.
Brabers, V.A.M. et al., "Thermo Electric Properties of Titanium Doped Hausmannite", Solid State Communications, Mar. 1983, pp. 807-809, vol. 45, No. 9.
Jha, A. et al., "Structural Transformation From Mn304 nanorods to nanoparticles and band gap tuning via Zn doping", Materials Research Bukketin, Dec. 1, 2011, pp. 813-819, vol. 47, No. 3.
U.S. Appl. No. 14/395,191 to Eiichi Iwata et al., filed Oct. 17, 2014.
U.S. Appl. No. 14/386,480 to Takahiro Matsunaga et al., filed Sep. 19, 2014.
Search report from PCT/JP2013/059675, dated Jul. 2, 2013.
International Preliminary Report on Patentability dated Oct. 7, 2014 in English in PCT/JP2013/059675.
Japanese Office Action issued in Counterpart Patent Appl. No. 2013-078639, dated Feb. 7, 2017, along with an English translation thereof.
Japanese Office Action issued in Counterpart Patent Appl. No. 2013-078638, dated Feb. 7, 2017, along with an English translation thereof.
Japanese Office Action issued in Counterpart Patent Appl. No. 2013-078637, dated Feb. 7, 2017, along with an English translation thereof.
Japanese Office Action issued in Counterpart Patent Appl. No. 2013-078636, dated Feb. 7, 2017, along with an English translation thereof.
Lee et al., "Synthetic optimization of $Li[Ni_{1/3}Co_{1/3}Mn_{1/3}]O_2$ via co-precipitation"; Electrochimica Acta 50; Sep. 11, 2004; pp. 939-948.
Chinese Office Action issued in Counterpart Patent Appl. No. 201380018615.0, dated Jan. 16, 2017, along with an english translation thereof.

* cited by examiner

METAL-CONTAINING TRIMANGANESE TETRAOXIDE COMPOSITE PARTICLES AND METHOD FOR PRODUCING SAME

TECHNICAL FIELD

The present invention relates to metal-containing manganese oxide combined particles and their production process, and a process for producing a metal-substituted lithium manganese oxide using them.

BACKGROUND ART

Manganese oxide ($MnO_x$) is used as a material of a lithium manganese oxide used as a cathode material of a lithium secondary battery. In order to obtain a cathode material of a lithium secondary battery with a higher battery performance, a so-called metal-substituted lithium manganese oxide having a part of manganese substituted by another metal has been reported.

As a method for producing such a metal-substituted lithium manganese oxide, a method has been reported in which in addition to a lithium material and a manganese material, another metal compound is added, followed by mixing and firing (Patent Document 1) or a method has been reported in which the respective materials are finely ground and formed into a slurry, and the slurry is dried to obtain agglomerates, which are fired (Patent Document 2).

Further, a method has been reported in which from an aqueous solution in which calcium and magnesium are added at the time of synthesis of manganese oxide, manganese hydroxide containing them is obtained and oxidized to obtain manganese oxide containing calcium and manganese (Patent Document 3).

Further, as a cathode material of a lithium secondary battery with a higher battery performance, a combined lithium composite oxide has been reported.

To obtain a cathode material using a composite oxide, a method has been reported in which lithium hydroxide, γ-MnOOH, tricobalt tetraoxide and nickel hydroxide are mixed and fired (Patent Document 4).

Further, a solution containing manganese, nickel and cobalt is subjected to precipitation in the presence of a complexing agent to obtain cobalt manganese co-precipitated nickel hydroxide particles in which these elements are uniformly dispersed, which are used as a material of a cathode material (Patent Document 5).

PRIOR ART DOCUMENTS

Patent Documents

Patent Document 1: JP-A-2001-307724
Patent Document 2: JP-A-11-171551
Patent Document 3: JP-A-2000-128540
Patent Document 4: JP-A-08-37007
Patent Document 5: JP-A-2002-201028

DISCLOSURE OF INVENTION

Technical Problem

The process in each of Patent Documents 1 and 2 is a process for producing a lithium manganese oxide which comprises mixing materials. By such a production process, the materials are hardly uniformly mixed. Further, the obtained lithium manganese oxide depends on the degree of mixing of the materials, and its battery performances tend to be non-uniform.

By the production process disclosed in Patent Document 3, the particle size distribution is uniform, but only small particles are obtained, which are difficult to handle. Further, by this production process, if the amount of addition of e.g. calcium exceeds 2.50 mol %, impurities tend to be included, and a uniform manganese material for a lithium manganese oxide is hardly obtained. A lithium manganese oxide obtained from such a manganese material having low uniformity tends to have low battery performances.

By the process for producing a cathode material which comprises mixing the respective materials of lithium, manganese, nickel and cobalt as disclosed in Patent Document 4, it tends to be difficult to uniformly mix the materials. Accordingly, not only the obtained cathode material is insufficient in the battery performances but also there is great dispersion among the lots, and it is difficult to constantly obtain a cathode material having the same battery performances.

On the other hand, in the cobalt manganese co-precipitated nickel hydroxide particles as disclosed in Patent Document 5, the elements are uniformly dispersed as compared with one obtained by mixing the respective materials. However, in order to obtain uniform cobalt manganese co-precipitated nickel hydroxide particles, ammonia or hydrazine is required as a reducing agent, and production in an industrial scale tends to be difficult.

The object of the present invention is to provide metal-containing trimanganese tetraoxide combined particles with which a metal-substituted lithium manganese oxide excellent as a cathode material for a lithium secondary battery can be obtained, and their production process. Another object of the present invention is to provide a process for producing a metal-substituted lithium manganese oxide using such metal-containing trimanganese tetraoxide combined particles.

Solution to Problem

The present inventors have conducted extensive studies on manganese oxide used as a material of a metal-substituted lithium manganese oxide which is a cathode of a lithium secondary battery. As a result, they have found that the above objects can be achieved by metal-containing trimanganese tetraoxide combined particles containing a specific metal element and preferably having their particle size controlled.

They have further found that such metal-containing trimanganese tetraoxide combined particles are obtained by a production process comprising a step of crystallizing trimanganese tetraoxide not by means of manganese hydroxide crystals or under conditions where the crystal growth of manganese hydroxide is sufficiently suppressed, from a manganese salt aqueous solution containing manganese ions and a metal element other than manganese and lithium.

That is, the present invention provides the following:

(1) Metal-containing trimanganese tetraoxide combined particles containing a metal element (excluding lithium and manganese).

(2) The metal-containing trimanganese tetraoxide combined particles according to the above (1), wherein the metal element is at least one member selected from the group consisting of Mg, Al, Si, Ca, Ti, V, Cr, Co, Ni, Cu, Zn, Ga, Ge, Y, Zr, Nb, Mo, Ag, In and Sn.

(3) The metal-containing trimanganese tetraoxide combined particles according to the above (1) or (2), wherein the metal element is at least one of Al and Mg.

(4) The metal-containing trimanganese tetraoxide combined particles according to any one of the above (1) to (3), wherein the average particle size is at least 1 μm and at most 30 μm.

(5) The metal-containing trimanganese tetraoxide combined particles according to any one of the above (1) to (4), wherein the coefficient of variation of the standard deviation of the particle size is at most 50%.

(6) The metal-containing trimanganese tetraoxide combined particles according to any one of the above (1) to (5), which are particles in which manganese in the crystal structure of trimanganese tetraoxide is substituted by the metal element.

(7) The metal-containing trimanganese tetraoxide combined particles according to the above (6), which are represented by the following formula (1):

$$A_xMn_{3-x}O_4 \quad (1)$$

wherein A is the metal element excluding lithium and manganese, and x is at most 1.

(8) The metal-containing trimanganese tetraoxide combined particles according to any one of the above (1) to (5), in which a compound containing a metal element and trimanganese tetraoxide combined in the form of particles.

(9) The metal-containing trimanganese tetraoxide combined particles according to the above (8), wherein the compound containing a metal element is at least one of aluminum hydroxide and nickel-cobalt composite hydroxide.

(10) A process for producing the metal-containing trimanganese tetraoxide combined particles as defined in any one of the above (1) to (9), which comprises a crystallization step of crystallizing trimanganese tetraoxide not by means of manganese hydroxide or under conditions where the crystal growth of manganese hydroxide is suppressed, from a manganese salt aqueous solution containing manganese ions and a metal element other than manganese and lithium.

(11) The production process according to the above (10), wherein the metal element is an ion or compound of at least one member selected from the group consisting of Mg, Al, Si, Ca, Ti, V, Cr, Co, Ni, Cu, Zn, Ga, Ge, Y, Zr, Nb, Mo, Ag, In and Sn.

(12) The production process according to the above (10) or (11), wherein in the crystallization step, metal-substituted trimanganese tetraoxide is crystallized under conditions which satisfy at least one of a pH of at least 6 and at most 9 and an oxidation-reduction potential of at least 0 mV and at most 300 mV.

(13) The production process according to any one of the above (10) to (12), wherein in the crystallization step, an oxygen-containing gas is blown into the manganese salt aqueous solution.

(14) A process for producing a metal-substituted lithium manganese oxide, which comprises a mixing step of mixing the metal-containing trimanganese tetraoxide combined particles as defined in any one of the above (1) to (9) with a lithium compound, and a heating step of subjecting the mixture to heat treatment.

(15) A lithium manganese oxide, which is obtained by using the metal-containing trimanganese tetraoxide combined particles as defined in any one of the above (1) to (9).

(16) A cathode active material, which comprises the lithium manganese oxide as defined in the above (15).

Advantageous Effects of Invention

The metal-containing trimanganese tetraoxide combined particles of the present invention can be used as a material of a lithium composite oxide which is a cathode active material for a lithium secondary battery, particularly a metal-substituted lithium manganese oxide.

Further, in a case where the metal-containing trimanganese tetraoxide combined particles of the present invention comprise metal-substituted trimanganese tetraoxide, the particles uniformly contain the metal and have a particle size excellent in the handleability. Further, they have a uniform composition even if the amount of the substituting metal is so large as about several mol %. Accordingly, they can be used as a material for production of a metal-substituted lithium manganese oxide having excellent battery performances, which is a cathode material of a lithium secondary battery.

Further, in a case where the metal-containing trimanganese tetraoxide combined particles of the present invention are metal-containing trimanganese tetraoxide particles combined particles, by the metal compound particles being at most 10 μm, the metal compound in the metal-containing trimanganese tetraoxide particles combined particles will more uniformly be dispersed. Accordingly, such particles can be used as a material for production of a metal-substituted lithium manganese oxide having excellent battery performances, which is a cathode material of a lithium secondary battery.

According to the production process of the present invention, the metal-containing trimanganese tetraoxide combined particles can be obtained by simple steps of crystallization, filtration and drying. Accordingly, they can easily be obtained without requiring high temperature or the like which is required in a so-called spraying method, in which a slurry is thermally decomposed by high temperature to obtain an oxide.

Further, according to the production process of the present invention, which does not require a complexing agent, a reducing agent, control of the atmosphere, etc., metal-containing trimanganese tetraoxide combined particles can be produced by a simple method as compared with a conventional material for a lithium composite oxide.

DESCRIPTION OF EMBODIMENTS

Figure 1:
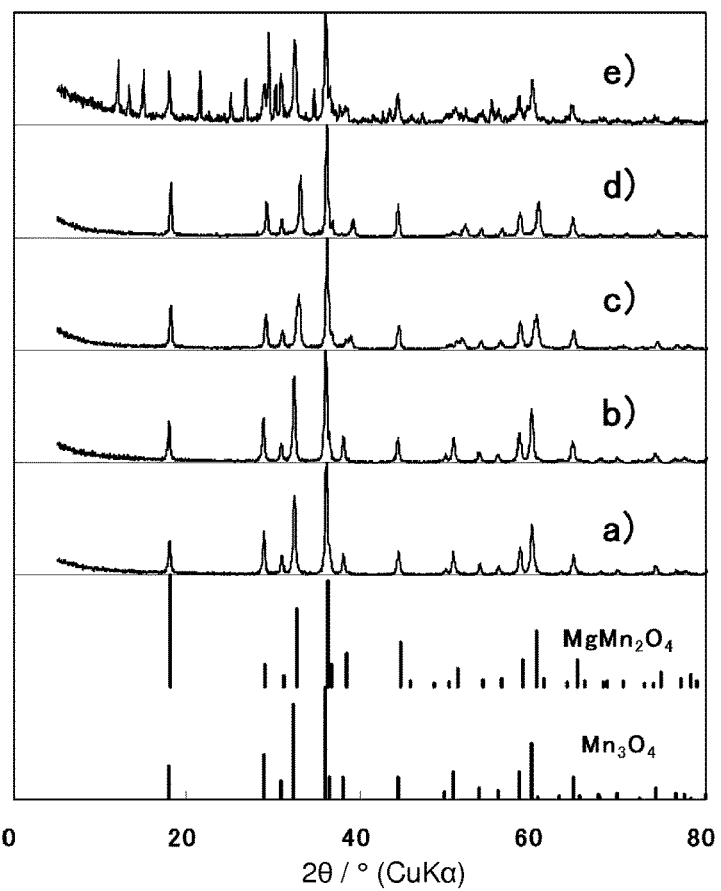
FIG. 1 illustrates powder X-ray diffraction patterns in Examples 1 to 4 and Comparative Example 1. a): Example 1, b): Example 2, c): Example 3, d): Example 4 and e): Comparative Example 1.

The metal-containing trimanganese tetraoxide combined particles of the present invention comprise trimanganese tetraoxide containing a metal element other than manganese and lithium (hereinafter sometimes referred to simply as "a metal element"). By the metal-containing tetraoxide combined particles of the present invention containing a metal element, the battery performances of a metal-substituted lithium manganese oxide obtained by using the particles as the material are likely to improve.

The metal element in the present invention includes not only a metal element but also a metal ion, a metal compound and metal compound particles.

In the present invention, "containing a metal element" not only includes an embodiment such that manganese is substituted with a metal element in the crystal structure of trimanganese tetraoxide but also an embodiment such that a compound containing a metal element (hereinafter sometimes referred to simply as "a metal compound") and trimanganese tetraoxide are combined in the form of particles, so that trimanganese tetraoxide contains a metal element.

"Combined in the form of particles" means that primary particles of at least one of the metal compound and trimanganese tetraoxide are agglomerated with particles of the other to form secondary particles. Accordingly, even when the metal-containing trimanganese tetraoxide combined particles of the present invention are dispersed in a solvent, they will not separate into the metal compound and trimanganese tetraoxide. Accordingly, for example, a mixture obtained by physically mixing trimanganese tetraoxide particles with metal compound particles is different from the metal containing metal-containing trimanganese tetraoxide combined particles of the present invention.

The metal element contained in the metal-containing trimanganese tetraoxide combined particles of the present invention is a metal element other than manganese (Mn) and lithium (Li), and is preferably at least one member selected from the group consisting of magnesium (Mg), aluminum (Al), silica (Si), calcium (Ca), titanium (Ti), vanadium (V), chromium (Cr), cobalt (Co), nickel (Ni), copper (Cu), zinc (Zn), gallium (Ga), germanium (Ge), zirconium (Zr), molybdenum (Mo), silver (Ag), indium (In) and tin (Sn). By containing such a metal element, battery performances of a metal-substituted lithium manganese oxide obtained by using the metal-containing trimanganese tetraoxide combined particles of the present invention as the material are likely to improve. In order to improve the charge and discharge cycle life and battery performances at high temperature of a metal-substituted lithium manganese oxide produced, the metal element is more preferably at least one member selected from the group consisting of nickel, cobalt, magnesium and aluminum.

The particle size of the metal-containing trimanganese tetraoxide combined particles of the present invention is at least 1 μm, preferably at least 2 μm, more preferably at least 3 μm. By containing substantially no fine particles less than 1 μm, the mixing property with a lithium compound will improve, and the handleability at the time of use tends to be high. The particle size of the combined particles is usually preferably at most 50 μm.

The average particle size is preferably at least 1 μm, more preferably at least 3 μm. By the average particle size being at least 1 μm, the storage stability of the metal-substituted lithium manganese oxide obtained by using the particles as the material tends to be high. The average particle size is at most 30 μm, further at most 20 μm, still further at most 15 μm, whereby the particles are readily used as the material of a metal-substituted lithium manganese oxide.

In the present invention, the average particle size means a particle size (so-called D50) of 50% on the volume basis. In a case where the particle size distribution of the combined particles is monomodal, the modal particle size agrees with the average particle size. In such a case, the modal particle size may be regarded as the average particle size.

The metal-containing trimanganese tetraoxide combined particles of the present invention have a coefficient of variation of the standard deviation of the particle size (hereinafter referred to as "Cv") of preferably at most 50%, more preferably at most 45%, further preferably at most 30%. By the Cv being at most 50%, the particle size tends to be uniform, whereby the reaction of the metal-containing trimanganese tetraoxide combined particles of the present invention and a lithium material will more uniformly proceed.

Further, Cv may be determined in accordance with the following formula:

$$Cv\ (\%) = (\text{standard deviation of particle size/average particle size}) \times 100$$

The fillability of the metal-containing trimanganese tetraoxide combined particles is preferably higher. However, the fillability of the metal-containing trimanganese tetraoxide combined particles varies depending upon the type and the amount of the metal element contained. A preferred tap density of the metal-containing trimanganese tetraoxide combined particles may, for example, be at least 1.0 g/cm³, further at least 1.1 g/cm³.

The crystal structure of trimanganese tetraoxide is a spinel structure. More particularly, trimanganese tetraoxide has a Hausmannite crystal structure, and this crystal structure is attributable to a space group I41/amd. The metal-containing trimanganese tetraoxide combined particles of the present invention preferably have such a crystal structure. This crystal structure shows No. 24-734 powder X-ray diffraction (hereinafter referred to as "XRD") pattern of the JCPDS pattern or an XRD pattern similar thereto.

With a view to obtaining high charge and discharge cycle life, the metal-containing trimanganese tetraoxide combined particles preferably have a low content of sulfate radicals ($SO_4^{2-}$). The content of sulfate radicals in the metal-containing trimanganese tetraoxide combined particles is preferably at most 5 wt %, more preferably at most 1.5 wt %, further preferably at most 1 wt %.

<Metal-Substituted Trimanganese Tetraoxide>

Now, the metal-containing trimanganese tetraoxide combined particles of the present invention wherein manganese in the crystal structure of trimanganese tetraoxide is substituted with a metal element (hereinafter referred to as metal-substituted trimanganese tetraoxide) will be described.

The metal-substituted trimanganese tetraoxide is preferably manganese oxide represented by the following formula (1).

$$A_xMn_{3-x}O_4 \quad (1)$$

The metal-substituted trimanganese tetraoxide is preferably manganese oxide of the formula (1) wherein x is at most 1. If x exceeds 1, the amount of Mn is too small, and the electric capacity of a metal-substituted lithium manganese oxide obtained by using it as a material tends to be low. x in the formula (1) is preferably at most 0.5, more preferably at most 0.35. On the other hand, x in the formula (1) is at least 0.01, further at least 0.05, still further at least 0.1 or further at least 0.2, whereby the effects by the substituting element are likely to be obtained.

In the formula (1), A is at least one metal element. With a view to improving the charge and discharge cycle life and the battery performances at high temperature of a metal-substituted lithium manganese oxide obtained by using the metal-substituted trimanganese tetraoxide as the material, A is more preferably at least one of Mg and Al, further preferably Mg.

In a case where the metal-substituted trimanganese tetraoxide is Mg-substituted trimanganese tetraoxide, the fillability of trimanganese tetraoxide tends to decrease as the Mg content increases. However, the metal-substituted trimanganese tetraoxide of the present invention preferably has a fillability not inferior to trimanganese tetraoxide not substituted by a metal, with a tap density of at least 1.1 g/cm³, further at least 1.5 g/cm³, still further at least 1.7 g/cm³.

The crystal structure of the metal-substituted trimanganese tetraoxide is preferably a spinel structure. Of the metal-substituted trimanganese tetraoxide, the crystal structure tends to change when the manganese ion is substituted by a metal ion. Accordingly, the XRD pattern of the metal-substituted trimanganese tetraoxide in the XRD measurement tends to be a pattern in which peaks of the XRD pattern of trimanganese tetraoxide are shifted.

Of the metal-substituted trimanganese tetraoxide, the BET specific surface area is preferably at most 6.5 m²/g, more preferably at most 5 m²/g. By the BET specific surface area being at most 6.5 m²/g, the metal-substituted trimanganese tetraoxide tends to have a high fillability, and the reactivity with a lithium compound tends to be uniform. Further, of the metal-substituted trimanganese tetraoxide, the BET specific surface area may be at most 3 m²/g, further at most 2 m²/g, still further 1 m²/g.

<Particulate Trimanganese Tetraoxide>

With respect to the metal-containing trimanganese tetraoxide combined particles of the present invention, a case where the compound containing a metal element (hereinafter sometimes referred to simply as "a metal compound") and trimanganese tetraoxide are combined in the form of particles (hereinafter sometimes referred to as "particulate trimanganese tetraoxide") will be described.

In the particulate trimanganese tetraoxide, primary particles of at least one of the metal compound and trimanganese tetraoxide are agglomerated with particles of the other to form secondary particles. In the particulate trimanganese tetraoxide, the trimanganese tetraoxide may be the metal-substituted trimanganese tetraoxide.

The particulate trimanganese tetraoxide may be trimanganese tetraoxide particles combined particles (hereinafter referred to as "particle-containing trimanganese tetraoxide") in such a state that trimanganese tetraoxide includes the metal compound particles, trimanganese tetraoxide combined particles which are trimanganese tetraoxide particles having the metal compound on their surface (hereinafter referred to as "metal-covered trimanganese tetraoxide") and trimanganese tetraoxide in the form of metal compound particles having trimanganese tetraoxide on their surface (hereinafter referred to as "trimanganese tetraoxide-covered metal compound").

Here, "the trimanganese tetraoxide includes" means that the secondary particles contain the metal compound and at least 50% of the surface of the particles comprises trimanganese tetraoxide, and "having trimanganese tetraoxide on the surface" means that the secondary particles contain the metal compound particles and less than 50% of the surface of the particles comprises trimanganese tetraoxide. Further, "having the metal oxide on their surface" means that secondary particles contain trimanganese tetraoxide particles, and less than 50% of the surface of the particles comprises the metal oxide.

<Particle-Containing Trimanganese Tetraoxide>

The particle-containing trimanganese tetraoxide is preferably trimanganese tetraoxide particles combined particles comprising trimanganese tetraoxide containing metal compound particles.

The metal compound particles may be particles of e.g. an oxide, a hydroxide or a carbonate of a metal compound, and are preferably particles of a hydroxide.

The metal compound is preferably a compound of at least one metal element. With a view to improving the charge and discharge cycle life and the battery performances at high temperature of a metal-substituted lithium manganese oxide produced, the metal compound particles are more preferably particles of a compound of at least one of Mg and Al, further preferably particles of a compound of Al, still further preferably aluminum hydroxide particles.

In the particle-containing trimanganese tetraoxide, the molar ratio of the metal element/manganese is preferably at most 0.33, more preferably at most 0.15. By the molar ratio of the metal element/manganese being at most 0.33, the amount of manganese which can contribute to the battery reaction tends to be large, whereby the electric capacity of a metal-substituted lithium manganese oxide obtained by using it as the material tends to be large.

The particle-containing trimanganese tetraoxide contains trimanganese tetraoxide and the metal compound. Accordingly, the XRD pattern of the particle-containing trimanganese tetraoxide shows both of the XRD pattern of a spinel structure and the XRD pattern of the metal compound.

The average particle size of the particle-containing trimanganese tetraoxide is preferably at least 1 µm, more preferably at least 3 µm. By the average particle size being at least 1 µm, the storage stability of a lithium manganese oxide obtained by using it as the material tends to be high. The average particle size is at most 30 µm, further at most 10 µm, whereby it is readily used as the material of a metal-substituted lithium manganese oxide.

Of the particle-containing trimanganese tetraoxide, the BET specific surface area is preferably at most 10 $m^2/g$, more preferably at most 4 $m^2/g$, further preferably at most 3 $m^2/g$. By the BET specific surface area being at most 10 $m^2/g$, the particle-containing trimanganese tetraoxide combined particles have a high fillability, and the reactivity with a lithium compound tends to be uniform.

In the particle-containing trimanganese tetraoxide, the metal compound particles and the trimanganese tetraoxide particles having about the same particle size are combined in many cases. On the other hand, in a case where the particles size of one of them is different from the particles size of the other, the particle-containing trimanganese tetraoxide is likely to be in a state such that the metal compound particles or the trimanganese tetraoxide particles are present on the surface of the other particles, that is, particles of one of them are covered.

<Metal-Covered Trimanganese Tetraoxide>

The metal-covered trimanganese tetraoxide is preferably trimanganese tetraoxide having a metal compound on the surface, whereby the battery performances particularly the charge and discharge cycle life of a metal-substituted lithium manganese oxide obtained by using the metal-covered trimanganese tetraoxide as a material tend to be high.

In the metal-covered trimanganese tetraoxide, the metal compound is present on the surface of the trimanganese tetraoxide particles. As a specific state of presence, a so-called core-shell structure in which the metal compound is present on the surface of the trimanganese tetraoxide particles may be mentioned.

The metal-covered trimanganese tetraoxide contains trimanganese tetraoxide and the metal compound. Accordingly, the X-ray diffraction pattern of the metal-covered trimanganese tetraoxide shows both of the XRD pattern of a spinel structure and the XRD pattern of the metal compound.

The metal compound may be an oxide, a hydroxide or a carbonate, and is preferably a hydroxide.

The metal compound is preferably a compound of at least one metal element.

With a view to improving the charge and discharge cycle life and the battery performances at high temperature of a lithium composite oxide produced, the metal compound is more preferably at least one of cobalt and nickel, further preferably cobalt and nickel, still further preferably nickel-cobalt composite hydroxide.

In a case where the metal compound is a composite metal compound containing a plurality of metals, the proportion of the respective metals is optional. For example, in a case where the metal oxide is a nickel-cobalt composite metal compound, the molar ratio of nickel/cobalt may be from 1/5 to 5/1, further from 4/5 to 6/5.

In the metal-covered trimanganese tetraoxide combined particles, the ratio of trimanganese tetraoxide to the metal (Me) in the metal compound is preferably Mn/Me of from 4/1 to 1/4 by the molar ratio.

Of the metal-covered trimanganese tetraoxide, the average particle size is preferably larger than 5 µm, more preferably at least 10 µm. The upper limit of the average particle size may optionally be set depending upon the particle size of the lithium composite oxide finally desired. The upper limit of the average particle size may, for example, be at most 20 µm.

Of the metal-covered trimanganese tetraoxide, the BET specific surface area is preferably larger than 10 $m^2/g$, more preferably at least 15 $m^2/g$. By the BET specific surface area larger than 10 $m^2/g$, the reactivity with a lithium compound tends to improve.

<Trimanganese Tetraoxide-Covered Metal Compound>

The trimanganese tetraoxide-covered metal compounds is preferably combined particles having trimanganese tetraoxide on the metal compound particles, whereby the battery performances particularly the charge and discharge cycle life of a metal-substituted lithium manganese oxide obtained by using the trimanganese tetraoxide-covered metal compound of the present invention as the material tend to be high.

The metal compound may be an oxide, a hydroxide or a carbonate, preferably a hydroxide. The metal compound particles are preferably particles of a compound of at least one metal element.

With a view to improving the charge and discharge cycle life and the battery performances at high temperature of a lithium composite oxide produced, the metal compound particles are more preferably particles of a compound of at least one of cobalt and nickel, further preferably particles of a compound of cobalt and nickel, still further preferably nickel-cobalt composite hydroxide particles.

In a case where the metal compound particles are particles of a composite metal compound containing a plurality of metals, the proportion of the respective metals is optional. For example, in a case where the metal oxide particles are nickel-cobalt composite metal compound particles, the molar ratio of nickel/cobalt may be from 1/5 to 5/1, further from 4/5 to 6/5.

The trimanganese tetraoxide-covered metal compound contains trimanganese tetraoxide and the metal compound. Accordingly, the XRD pattern shows both of the XRD pattern of the spinel structure and the XRD pattern of the metal compound.

In the trimanganese tetraoxide-covered metal compound, the ratio of trimanganese tetraoxide to the metal (Me) in the metal compound is preferably Mn/Me of from 4/1 to /4 by the molar ratio.

Of the trimanganese tetraoxide-covered metal compound, one of the state of presence of trimanganese tetraoxide may be a so-called core-shell structure in which trimanganese tetraoxide is present on the surface of particles of a single metal compound. In such a state of presence, by using a porous metal compound, the trimanganese tetraoxide can be dispersed even in the interior of pores of the metal oxide particles. Accordingly, the metal oxide particles contained in the metal compound combined particles of the present invention are preferably porous.

Of the trimanganese tetraoxide-covered metal compound, the average particle size is preferably larger than 5 µm, more preferably at least 10 µm, whereby trimanganese tetraoxide is likely to be dispersed on the metal compound particles. The upper limit of the average particle size may optionally be set depending upon the particle size of the lithium composite oxide finally desired. The upper limit of the average particle size may, for example, be at most 20 μm.

Of the trimanganese tetraoxide-covered metal compound, the BET specific surface area is preferably larger than 10 m²/g, more preferably at least 15 m²/g. By the BET specific surface area being larger than 10 m²/g, the reactivity with a lithium compound tends to improve.

<Process for Producing Metal-Containing Trimanganese Tetraoxide Combined Particles>

The metal-containing trimanganese tetraoxide combined particles of the present invention may be obtained by a production process comprising a crystallization step of crystallizing trimanganese tetraoxide not by means of manganese hydroxide or under conditions where the crystal growth of manganese hydroxide is sufficiently suppressed, from a manganese salt aqueous solution containing manganese ions and a metal element other than manganese and lithium (hereinafter referred to as "a metal element-containing manganese salt aqueous solution").

In the above step of crystalizing trimanganese tetraoxide not by means of manganese hydroxide from the metal element-containing manganese salt aqueous solution, trimanganese tetraoxide is crystallized without precipitating crystals of manganese hydroxide in an alkaline region, from the metal element-containing manganese salt aqueous solution.

Accordingly, in the process for producing the metal-containing trimanganese tetraoxide combined particles of the present invention, the metal-containing trimanganese tetraoxide combined particles are produced from the metal element-containing manganese salt aqueous solution, without a step of precipitating a hydroxide of manganese such as manganese hydroxide and a metal-containing manganese hydroxide (hereinafter sometimes they will generally be referred to as "manganese hydroxide") in an alkaline region and oxidizing the manganese hydroxide by an oxidizing agent. Thus, the metal-containing trimanganese tetraoxide combined particles can be obtained continuously from the metal element-containing manganese salt aqueous solution.

Further, the process for producing the metal-containing trimanganese tetraoxide combined particles of the present invention includes, in the crystallization step, an embodiment such that a crystal phase of manganese hydroxide does not form at all and an embodiment such that fine crystals of a hydroxide are precipitated in a short time and then they are converted to trimanganese tetraoxide before they grow into hexagonal plate-form crystals. That is, the process for producing the metal-containing trimanganese tetraoxide combined particles of the present invention is characterized in that in the crystallization step, hexagonal plate-form crystals of manganese hydroxide will not form. By the crystals of manganese hydroxide not forming, metal-containing trimanganese tetraoxide combined particles having the surface area and the fillability appropriately controlled can be obtained.

Whether hexagonal plate-form crystals of manganese hydroxide formed or not can be judged by observing the crystal shape of the obtained metal-containing trimanganese tetraoxide combined particles.

In the crystallization step, the metal element contained in the metal element-containing manganese salt aqueous solution is in the form of at least one of the metal compound particles and the metal ions. In a case where the metal element-containing manganese salt aqueous solution contains metal ions as the metal element, trimanganese tetraoxide crystalized in the crystallization step may be metal-substituted trimanganese tetraoxide having part of manganese is substituted by the metal element.

In the crystallization step, the pH of the metal element-containing manganese salt aqueous solution when trimanganese tetraoxide is crystalized or the pH of the slurry containing crystalized trimanganese tetraoxide is preferably such a pH that manganese hydroxide hardly forms, more preferably a pH in a region of from weakly acidic to weakly alkaline.

Specifically, the pH is preferably at least 6 and at most 9, more preferably at least 6.5 and at most 8.5. Further, it is further preferred that the center valve of the pH is within such a range. By the pH of the metal element-containing manganese salt aqueous solution or the slurry being within such a range, manganese hydroxide will hardly form.

The pH of the metal element-containing manganese salt aqueous solution or the slurry is preferably within the above range during the crystallization step. The dispersion of the pH of the metal element-containing manganese salt aqueous solution or the slurry during the crystallization step is preferably small. Specifically, the pH is maintained in a range of the center value±0.5, more preferably within a range of the center value±0.3, further preferably within a range of the center value±0.1.

In the production process of the present invention, in the crystallization step, the oxidation-reduction potential of the metal element-containing manganese salt aqueous solution to the standard hydrogen electrode (hereinafter sometimes referred to simply as "oxidation-reduction potential") is preferably at least 0 mV and at most 300 mV, more preferably at least 30 mV and at most 150 mV. By the oxidation-reduction potential of the metal element-containing manganese salt aqueous solution being within such a range, manganese hydroxide will hardly form. Further, by the oxidation-reduction potential of the metal element-containing manganese salt aqueous solution being at most 300 mV, γ-MnOOH having a shape of needle particles is less likely to form as a by-product, and the fillability of the obtained metal-containing trimanganese tetraoxide combined particles tends to be higher.

The oxidation-reduction potential of the element-containing manganese salt aqueous solution or the slurry in the crystallization step is preferably within the above range during the crystallization step. Further, the dispersion of the oxidation-reduction potential of the metal element-containing manganese salt aqueous solution or the slurry during the crystallization step is preferably small. Specifically, the oxidation-reduction potential is maintained preferably within a range of the center value±50 mV, more preferably within a range of the center value±30 mV, further preferably within a range of the center value±20 mV.

Metal-containing trimanganese tetraoxide combined particles having a uniform particle size can be obtained by crystallization with the pH, the oxidation-reduction potential or both within the above ranges and with a small range of fluctuation of the pH, the oxidation-reduction potential or both in the crystallization step. The metal-containing trimanganese tetraoxide combined particles thus obtained have a high fillability and are likely to be uniformly reacted with a lithium compound.

The metal element-containing manganese salt aqueous solution used in the crystallization step contains manganese ions and a metal element.

The metal element is preferably an ion or compound of at least one member selected from the group consisting of Mg, Al, Si, Ca, Ti, V, Cr, Co, Ni, Cu, Zn, Ga, Ge, Y, Zr, Nb, Mo, Ag, In and Sn. By containing such a metal element, the battery performances of a metal-substituted lithium manganese oxide obtained from the metal-containing trimanganese tetraoxide combined particles obtained by the production process of the present invention as a material tend to improve. With a view to improving the charge and discharge cycle life and the battery performances at high temperature of a metal-substituted lithium manganese oxide produced, the metal element is more preferably in the form of particles of an ion or compound of at least one of Ni, Co, Mg and Al.

In a case where the metal-substituted trimanganese tetraoxide is to be produced, the metal element-containing manganese salt aqueous solution should contain at least metal ions, and the metal ions are preferably ions of at least one of Mg and Al, more preferably Mg ions.

Whereas, in a case where the trimanganese tetraoxide particles combined particles are to be produced, the metal element-containing manganese salt aqueous solution should contain at least metal compound particles, and the metal compound particles are preferably particles of a compound of at least one of Al, Ni and Co, more preferably either of aluminum hydroxide particles and nickel-cobalt composite oxide particles.

In a case where the metal element-containing manganese salt solution contains ions of a metal element, an aqueous solution of a sulfate, a chloride, a nitrate or an acetate of manganese or the metal element, or a solution of such a metal or its oxide or the like dissolved in an acid aqueous solution of e.g. sulfuric acid, hydrochloric acid, nitric acid or acetic acid, may be used.

In a case where the metal element-containing manganese salt solution contains the metal element as metal compound particles, the metal compound particles may be particles of an oxide, a hydroxide, a carbonate or the like of the metal element.

In a case where the trimanganese tetraoxide particles combined particles are to be produced, the particle size of the metal compound particles is preferably at least 1 μm.

Further, the particle-containing trimanganese tetraoxide combined particles are to be produced, the metal compound particles preferably have an average particle size of at most 5 μm, more preferably at most 3 μm. By the average particle size being at most 5 μm, the particles are likely to be precipitated in such a manner that trimanganese tetraoxide includes the metal compound particle.

On the other hand, when the trimanganese tetraoxide-covered combined particles are to be produced, the metal compound particles preferably have an average particle size larger than 5 μm, more preferably at least 10 μm. If the average particle size is at most 5 μm, when trimanganese tetraoxide is crystalized, single particles in such a state that trimanganese tetraoxide includes a plurality of metal compound particles are likely to form, and particle-containing trimanganese tetraoxide combined particles are likely to form. The upper limit of the average particle size of the metal compound particles may optionally be selected depending upon the particle size of the trimanganese tetraoxide-covered combined particles desired. For example, the upper limit of the average particle size may be at most 20 μm.

The concentration of the metal element-containing manganese salt aqueous solution is optional, and the total concentration of the manganese ions and the metal ions of the metal element may, for example, be at least 1 mol/L. By the total concentration of the metal ions of the metal element-containing manganese salt aqueous solution being at least 1 mol/L, the metal-containing trimanganese tetraoxide combined particles can efficiently be obtained.

In the metal element-containing manganese salt solution, the proportion of the metal element ions to the manganese ions is optional. For example, the ratio of the molar concentration of the metal element ions to the molar concentration of the manganese ions (Me/Mn (mol/mol)) may, for example, be $0<Me/Mn\leq0.5$ (Me is the metal element) in a case where the metal element is present only in the form of ions, and $0\leq Me/Mn\leq0.5$ in a case where the metal element includes the metal compound particles.

To adjust the pH of the metal element-containing manganese salt aqueous solution, an alkaline aqueous solution (hereinafter referred to as an alkali aqueous solution) is preferably used. The alkali aqueous solution is not limited and may, for example, be an aqueous solution of sodium hydroxide, potassium hydroxide or the like.

The concentration of the alkali metal or the alkaline earth metal in the alkali aqueous solution may, for example, be at least 1 mol/L.

In the production process of the present invention, in the crystallization step, the temperature of the metal element-containing manganese salt aqueous solution may, for example, be at least 60° C. and at most 95° C., preferably at least 70° C. and at most 80° C. By the temperature of the metal element-containing manganese salt aqueous solution at the time of crystallization being within such a range, the particle size of the metal-containing trimanganese tetraoxide combined particles tends to be uniform.

In the production process of the present invention, in the crystallization step, it is preferred to carry out crystallization using an oxidizing agent. The oxidizing agent may, for example, be a gaseous oxidizing agent such as an oxygen-containing gas or a liquid oxidizing agent such as hydrogen peroxide. From the viewpoint of easy handleability, the oxidizing agent is preferably a gaseous oxidizing agent, more preferably an oxygen-containing gas, further preferably the air. Further, it is more preferred to carry out crystallization while the gaseous oxidizing agent is blown into the metal element-containing manganese salt aqueous solution, whereby crystallization of trimanganese tetraoxide will more uniformly take place.

In the production process of the present invention, in the crystallization step, it is preferred that the metal element-containing manganese salt aqueous solution and the alkaline aqueous solution are mixed.

The method of mixing the metal element-containing manganese salt aqueous solution with the alkaline aqueous solution is not particularly limited so long as they can uniformly be mixed. The mixing method may, for example, be a mixing method of adding the alkali aqueous solution to the metal element-containing manganese salt aqueous solution or a mixing method of adding the metal element-containing manganese salt aqueous solution and the alkali aqueous solution to a solvent such as pure water. With a view to sufficiently and uniformly reacting the metal element-containing manganese salt aqueous solution and the alkali aqueous solution, the mixing method is preferably a mixing method of adding the metal element-containing manganese salt aqueous solution and the alkali aqueous solution to the solvent.

In a conventional process for producing trimanganese tetraoxide, manganese hydroxide is formed in a nitrogen atmosphere and then trimanganese tetraoxide is formed in an oxidizing atmosphere. Accordingly, change of the reaction atmosphere is essential for formation of trimanganese tetraoxide in the conventional production process, and metal-containing trimanganese tetraoxide combined particles cannot continuously be produced. Whereas, in the production process of the present invention, trimanganese tetraoxide is directly crystallized from the metal element-containing manganese salt aqueous solution. Accordingly, it is not necessary to change the reaction atmosphere in the middle of the process. Accordingly, the metal-containing trimanganese tetraoxide combined particles can be produced continuously directly from the metal element-containing manganese salt aqueous solution.

In the production process of the present invention, in the crystallization step, crystallization is carried out preferably without a complexing agent. The complexing agent may be ammonia, an ammonium salt, hydrazine and EDTA, and one having the same complexing ability as those.

Such a complexing agent influences the trimanganese tetraoxide crystallization behavior. Accordingly, metal-containing trimanganese tetraoxide combined particles obtained in the presence of a complexing agent are different in powder properties such as the particle size from metal-containing trimanganese tetraoxide combined particles obtained without using a complexing agent although they have the same composition.

Whereas, in a case where the metal-containing trimanganese tetraoxide combined particles of the present invention are trimanganese tetraoxide-covered combined particles, precipitation of the metal compound is carried out preferably by mixing a slurry containing at least one of trimanganese tetraoxide and metal-containing trimanganese tetraoxide combined particles, and the metal salt aqueous solution and the alkali aqueous solution.

The metal salt aqueous solution may, for example, be an aqueous solution of e.g. a sulfate, a chloride, a nitrate or an acetate of a metal. Further, a solution of a metal or its oxide or the like dissolved in an acid aqueous solution of e.g. sulfuric acid, hydrochloric acid, nitric acid or acetic acid may also be suitably be used.

The metal of the metal salt aqueous solution is preferably in the form of ions of at least one metal element. By containing such a metal salt, battery performances of a metal-substituted lithium composite oxide obtained from the obtained trimanganese tetraoxide-covered combined particles as the material tend to improve.

In order to improve the charge and discharge cycle life and the battery performances at high temperature of a metal-substituted lithium composite oxide produced, the metal of the metal salt aqueous solution is more preferably at least one of cobalt and nickel, further preferably cobalt and nickel.

The concentration of the metal salt aqueous solution is preferably at least 1 mol/L at the metal ion concentration in view of the productivity.

The alkali aqueous solution may, for example, be an aqueous solution of e.g. sodium hydroxide, potassium hydroxide or ammonia. The alkali aqueous solution is preferably a sodium hydroxide aqueous solution, which is easily handled. Further, the concentration of the alkali aqueous solution may, for example, be at least 1 mol/L as the hydroxide concentration.

In the production process of the present invention, a slurry containing trimanganese tetraoxide or the metal-containing trimanganese tetraoxide combined particles, and the metal salt aqueous solution and the alkali aqueous solution, are mixed, whereby the metal compound is precipitated on their surface.

In order to obtain a high fillability of the trimanganese tetraoxide-covered combined particles, the mixing temperature is preferably at least 40° C., more preferably at least 60° C. Further, the reaction time is preferably at least 1 hour.

The pH to precipitate the metal compound on the trimanganese tetraoxide or the metal-containing trimanganese tetraoxide combined particles is optional, and the pH may, for example, be at least 7.5 and at most 10.

The process for producing the metal-containing trimanganese tetraoxide combined particles of the present invention may comprises a firing step of firing the obtained metal-containing trimanganese tetraoxide combined particles to obtain metal-containing manganese sesquioxide combined particles.

(Method for Producing Metal-Substituted Lithium Manganese Oxide)

The metal-containing trimanganese tetraoxide combined particles of the present invention may be used as a material of a metal-substituted lithium manganese oxide. Further, the metal-substituted lithium manganese oxide thus obtained may be used as a cathode material such as a cathode active material, preferably as a cathode active material of a lithium secondary battery.

The process for producing a metal-substituted lithium manganese oxide of the present invention comprises a mixing step of mixing the above metal-containing trimanganese tetraoxide combined particles with at least one of lithium and a lithium compound, and a heating step of subjecting the mixture to heat treatment.

The lithium compound may be any compound. The lithium compound may, for example, be lithium hydroxide, lithium oxide, lithium carbonate, lithium iodide, lithium nitrate, lithium oxalate or an alkyl lithium. A preferred lithium compound may, for example, be lithium hydroxide, lithium oxide or lithium carbonate.

The metal-substituted lithium manganese oxide preferably has a spinel or layered rock-salt crystal structure. Further, in the case of a spinel crystal structure, the composition is more preferably represented by the following formula:

$$Li_{1+y}A_zMn_{2-y-z}O_4$$

In the above formula, A is a metal element other than Mn, preferably at least one metal element, and y and z respectively satisfy the following formulae:

$$0 \leq y \leq 0.33$$

$$0 \leq z \leq 0.67$$

EXAMPLES

Now, the present invention will be described in further detail with reference to specific Examples. However, the present invention is by no means restricted to such specific Examples. Evaluations in Examples and Comparative Examples were carried out as follows.

(Chemical Composition Analysis)

A sample was dissolved in a mixed aqueous solution of hydrochloric acid and hydrogen peroxide, and the contents of Ni, Co, Na, Mg, Ca, Li, $SO_4^{2-}$ and Mn were obtained by an ICP method.

(Powder X-Ray Diffraction Measurement)

The crystal phase of a sample was measured by powder X-ray diffraction (hereinafter sometimes referred to as "XRD"). For measurement, a conventional X-ray diffraction apparatus was used. Measurement was carried out using CuKα radiation (λ=1.5405 Å) as the light source with a step scanning as the measurement mode under scanning conditions of 0.04° per second for a measuring time of 3 seconds within a measurement range 2θ of from 5° to 80°.

(Average Particle Size)

As the average particle size of a sample, the modal particle size was measured. For measurement of the modal particle size, MICROTRAC HRA 9320-X100 (manufactured by Nikkiso Co., Ltd., tradename) was used. Further, before measurement, the sample was dispersed in pure water to obtain a measurement solution, and ammonia water was added thereto to adjust the pH to be 8.5. Then, the measurement solution was subjected to ultrasonic dispersion for 3 minutes, and then the modal particle size was measured.

(Tap Density Measurement)

2 g of a sample was filled in a 10 ml glass measuring cylinder and tapped 200 times manually. The tap density was calculated from the weight and the volume after tapping.

(Battery Performance Evaluation)

A test on battery performances of a lithium composite oxide as a cathode was carried out.

A lithium composite oxide and an electrically conductive agent (a mixture of polytetrafluoroethylene with acetylene black, tradename: TAB-2) were mixed in a weight ratio of 4:1, formed into pellets on a mesh (made of SUS 316) under a pressure of 1 ton/cm$^2$, and the pellets were vacuum dried at 150° C. to prepare a cathode for a battery. Using the obtained cathode for a battery, an anode made of a metal lithium foil (thickness: 0.2 mm) and an electrolyte having lithium hexafluorophosphate dissolved at a concentration of 1 mol/dm$^3$ in a mixed solvent of ethylene carbonate and diethyl carbonate, a battery was constituted. Using the battery, charge and discharge were carried out at a constant current under a battery voltage of from 4.3 V to 2.5 V at room temperature. The initial discharge capacity and the discharge capacity at the 10th charge and discharge were evaluated.

[Production of Metal-Substituted Trimanganese Tetraoxide]

Example 1

Manganese sulfate (manufactured by Wako Pure Chemical Industries, Ltd., special grade reagent) and magnesium sulfate (manufactured by Wako Pure Chemical Industries, Ltd., special grade reagent) were dissolved in pure water to obtain a material solution containing 1.98 mol/L (liter) of manganese sulfate and 0.02 mol/L of magnesium sulfate. The Mg/Mn molar ratio in the material solution was 0.01.

The obtained material solution was added to pure water at 80° C., whereby a reaction slurry in which an oxide was crystalized was obtained. Addition of the material solution was carried out while an oxygen gas was blown into the pure water (reaction slurry) so that the oxidation-reduction potential of the pure water (reaction slurry) would be 100±20 mV, and a 2 mol/L sodium hydroxide aqueous solution was added to the pure water (reaction slurry) so that the pH of the pure water (reaction slurry) would be constant at 8.0.

The obtained reaction slurry was subjected to filtration, washed with pure water and dried in the air at 120° C. to obtain an oxide in Example 1.

The composition of the oxide in this Example was Mg/Mn molar ratio of 0.008. Further, the XRD pattern of the oxide in Example 1 showed a spinel structure of the same XRD pattern as No. 24-734 X-ray diffraction pattern of the JCPDS pattern, however, the peak shifted to a high angle side, the peak intensity ratio was changed, and the peak shifted to No. 23-392 XRD pattern of the JCPDS pattern.

From these results, the oxide in Example 1 was found to be Mg-substituted trimanganese tetraoxide represented by the formula $Mg_{0.02}Mn_{2.98}O_4$.

Of the Mg-substituted trimanganese tetraoxide in this Example, the evaluation results are shown in Table 1, and the XRD pattern is shown in FIG. 1.

Example 2

An oxide in this Example was obtained in the same manner as in Example 1 except that as the material solution, an aqueous solution containing 1.9 mol/L of manganese sulfate and 0.1 mol/L of magnesium sulfate was used. The Mg/Mn molar ratio in the material solution was 0.05.

The composition of the oxide in this Example was Mg/Mn molar ratio of 0.045. Further, the XRD pattern of the oxide in Example 1 showed a spinel structure of the same XRD pattern as No. 24-734 X-ray diffraction pattern of the JCPDS pattern, however, the peak shifted to a high angle side, the peak intensity ratio was changed, and the pattern shifted to No. 23-392 XRD pattern of the JCPDS pattern i.e. an XRD pattern of the spinel structure represented by the compositional formula $MgMn_2O_4$.

From these results, the oxide in this Example was found to be Mg-substituted trimanganese tetraoxide represented by the formula $Mg_{0.13}Mn_{2.87}O_4$.

Figure 2:
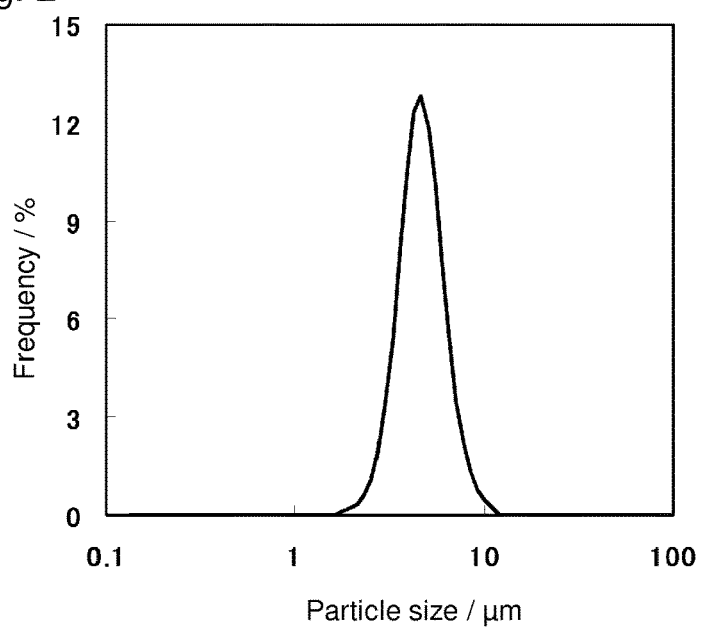
FIG. 2 illustrates a particle size distribution of Mg-substituted trimanganese tetraoxide in Example 2.

Of the Mg-containing manganese oxide in this Example, the evaluation results are shown in Table 1, the XRD pattern is shown in FIG. 1, and the particle size distribution is shown in FIG. 2.

Example 3

An oxide in this Example was obtained in the same manner as in Example 1 except that as the material solution, an aqueous solution containing 1.8 mol/L of manganese sulfate and 0.2 mol/L of magnesium sulfate was used. The Mg/Mn molar ratio in the material solution was 0.11.

The composition of the oxide in this Example was Mg/Mn molar ratio of 0.08. Further, the XRD pattern of the oxide in Example 1 showed a spinel structure of the same XRD pattern as No. 24-734 XRD pattern of the JCPDS pattern, however, the peak shifted to a high angle side, the peak intensity ratio was changed, and the pattern shifted to No. 23-392 XRD pattern of the JCPDS pattern.

From these results, the oxide in this Example was found to be Mg-substituted trimanganese tetraoxide represented by the formula $Mg_{0.22}Mn_{2.78}O_4$. Of the Mg-containing manganese oxide in this Example, the evaluation results are shown in Table 1, and the XRD pattern is shown in FIG. 1.

Example 4

An oxide in this Example was obtained in the same manner as in Example 1 except that as the material solution, an aqueous solution containing 1.75 mol/L of manganese sulfate and 0.25 mol/L of magnesium sulfate was used. The Mg/Mn molar ratio in the material solution was 0.14.

The composition of the oxide in this Example was Mg/Mn molar ratio of 0.13. Further, the XRD pattern of the oxide in this Example showed a spinel structure of the same XRD pattern as No. 24-734 XRD pattern of the JCPDS pattern, however, the peak shifted to a high angle side, the peak intensity ratio was changed, and the pattern shifted to No. 23-392 XRD pattern of the JCPDS pattern.

From these results, the oxide in this Example was found to be Mg-substituted trimanganese tetraoxide represented by the formula $Mg_{0.35}Mn_{2.65}O_4$. Of the Mg-containing manganese oxide in this Example, the evaluation results are shown in Table 1, and the XRD pattern is shown in FIG. 1.

From the XRD patterns in Examples 1 to 4, it was found that the XRD peak shifted to a high angle side along with an increase in the Mg content in the manganese oxide. Thus, it was found that in such Mg-substituted trimanganese tetraoxide, Mg substituted in the spinel crystal structure of trimanganese tetraoxide.

Example 5

An oxide in this Example was obtained in the same manner as in Example 1 except that as the material solution, an aqueous solution containing 1.94 mol/L of manganese sulfate and 0.06 mol/L of magnesium sulfate was used, and that reaction was continuously carried out for 100 hours while the reaction slurry was withdrawn at the same rate as the rate of addition of the material solution. The Mg/Mn molar ratio in the material solution was 0.03.

The composition of the oxide in this Example was Mg/Mn molar ratio of 0.02. Further, the XRD pattern of the oxide in this Example showed a spinel structure of the same XRD pattern as No. 24-734 XRD pattern of the JCPDS pattern, however, the peak shifted to a high angle side, the peak intensity ratio was changed, and the pattern shifted to No. 23-392 XRD pattern of the JCPDS pattern.

Figure 3:
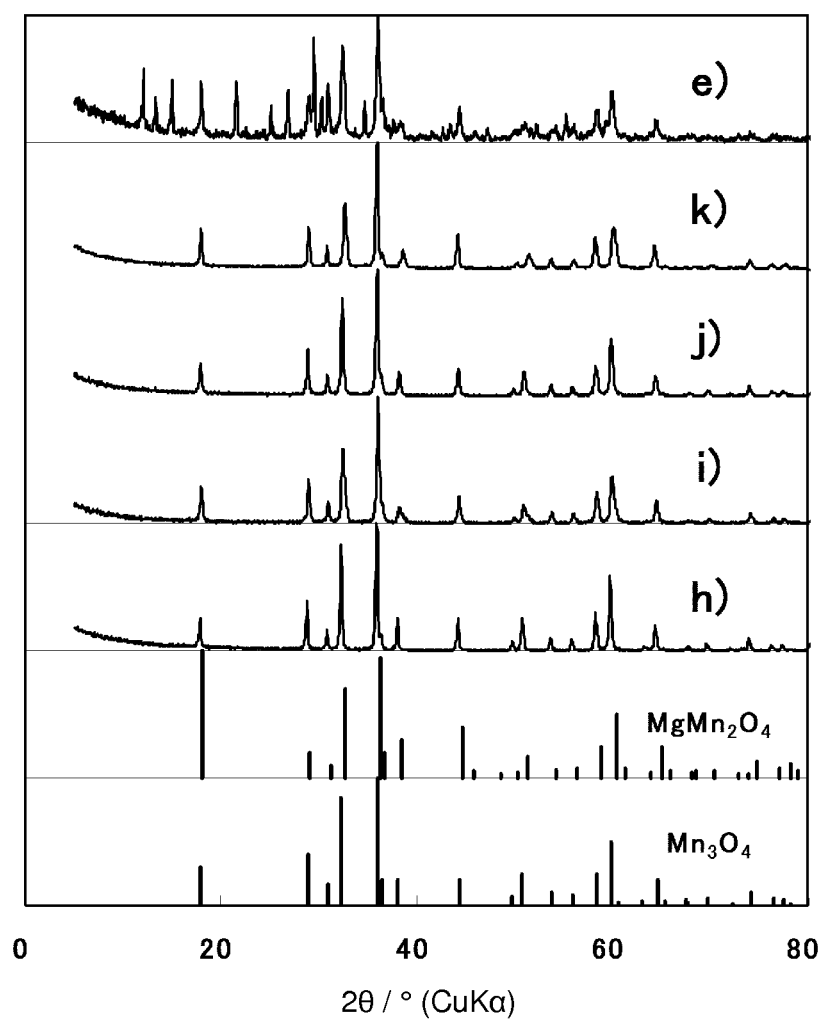
FIG. 3 illustrates powder X-ray diffraction patterns in Examples 5 to 8 and Comparative Example 1. h): Example 5, i): Example 6, j): Example 7, k): Example 8 and e): Comparative Example 1.

From these results, the oxide in this Example was found to be Mg-substituted trimanganese tetraoxide represented by the formula $Mg_{0.07}Mn_{2.93}O_4$. Of the Mg-containing manganese oxide in this Example, the evaluation results are shown in Table 1, and the XRD pattern is shown in FIG. 3.

Example 6

An oxide in this Example was obtained in the same manner as in Example 5 except that as the material solution, an aqueous solution containing 1.68 mol/L of manganese sulfate and 0.32 mol/L of magnesium sulfate was used. The Mg/Mn molar ratio in the material solution was 0.16.

The composition of the oxide in this Example was Mg/Mn molar ratio of 0.03. Further, the XRD pattern of the oxide in this Example showed a spinel structure of the same XRD pattern as No. 24-734 XRD pattern of the JCPDS pattern, however, the peak shifted to a high angle side, the peak intensity ratio was changed, and the pattern shifted to No. 23-392 XRD pattern of the JCPDS pattern.

From these results, the oxide in additional Example 2 was found to be Mg-substituted trimanganese tetraoxide represented by the formula $Mg_{0.08}Mn_{2.92}O_4$. Of the Mg-containing manganese oxide in this Example, the evaluation results are shown in Table 1, and the XRD pattern is shown in FIG. 3.

Example 7

An oxide in this Example was obtained in the same manner as in Example 5 except that as the material solution, an aqueous solution containing 1.86 mol/L of manganese sulfate and 0.14 mol/L of magnesium sulfate was used. The Mg/Mn molar ratio in the material solution was 0.07.

The composition of the oxide in this Example was Mg/Mn molar ratio of 0.03. Further, the XRD pattern of the oxide in this Example showed a spinel structure of the same XRD pattern as No. 24-734 XRD pattern of the JCPDS pattern, however, the peak shifted to a high angle side, the peak intensity ratio was changed, and the pattern shifted to No. 23-392 XRD pattern of the JCPDS pattern.

From these results, the oxide in this Example was found to be Mg-substituted trimanganese tetraoxide represented by the formula $Mg_{0.1}Mn_{2.9}O_4$. Of the Mg-containing manganese oxide in this Example, the evaluation results are shown in Table 1, and the XRD pattern is shown in FIG. 3.

Example 8

An oxide in this Example was obtained in the same manner as in Example 5 except that as the material solution, an aqueous solution containing 1.68 mol/L of manganese sulfate and 0.32 mol/L of magnesium sulfate was used. The Mg/Mn molar ratio in the material solution was 0.16.

The composition of the oxide in this Example was Mg/Mn molar ratio of 0.07. Further, the XRD pattern of the oxide in this Example showed a spinel structure of the same XRD pattern as No. 24-734 XRD pattern of the JCPDS pattern, however, the peak shifted to a high angle side, the peak intensity ratio was changed, and the pattern shifted to No. 23-392 XRD pattern of the JCPDS pattern.

Figure 4:
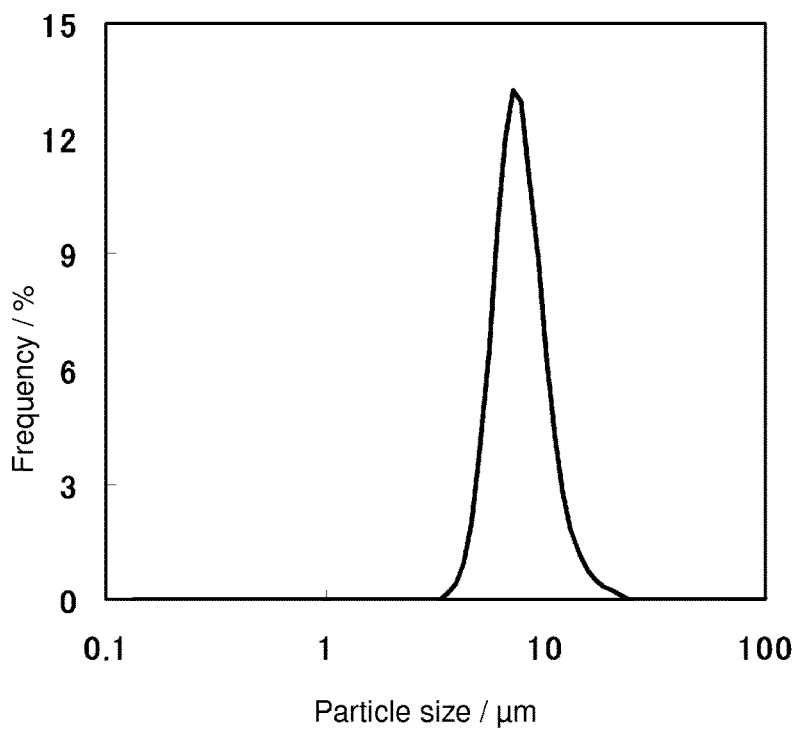
FIG. 4 illustrates a particle size distribution of Mg-substituted trimanganese tetraoxide in Example 8.

From these results, the oxide in this Example was found to be Mg-substituted trimanganese tetraoxide represented by the formula $Mg_{0.2}Mn_{2.8}O_4$. Of the Mg-containing manganese oxide in this Example, the evaluation results are shown in Table 1, the XRD pattern is shown in FIG. 3, and the particle size distribution is shown in FIG. 4.

From the results in these Examples, it was confirmed that by the production process of the present invention, metal-substituted trimanganese tetraoxide could be continuously produced over a long period of at least 100 hours.

Comparative Example 1

A material solution was obtained in the same manner as in Example 2. The Mg/Mn molar ratio in the material solution was 0.05.

The obtained material solution was added to pure water at 80° C., whereby a hydroxide was formed to obtain a reaction slurry. Addition of the material solution was carried out while a nitrogen gas was blown into the pure water (reaction slurry) and a 2 mol/L sodium hydroxide aqueous solution was added to the pure water (reaction slurry) so that the pH of the pure water (reaction slurry) would be constant at 10.

After the hydroxide was formed, blowing of the nitrogen gas was suspended, and the air was blown into the reaction slurry to obtain a reaction slurry containing an oxide.

The obtained reaction slurry was subjected to filtration, washed with pure water and dried in the air at 120° C. to obtain an oxide in Comparative Example 1.

The oxide in this Comparative Example had a composition of Mg/Mn molar ratio of 0.001, and was Mg-containing manganese oxide containing Mg.

Figure 5:
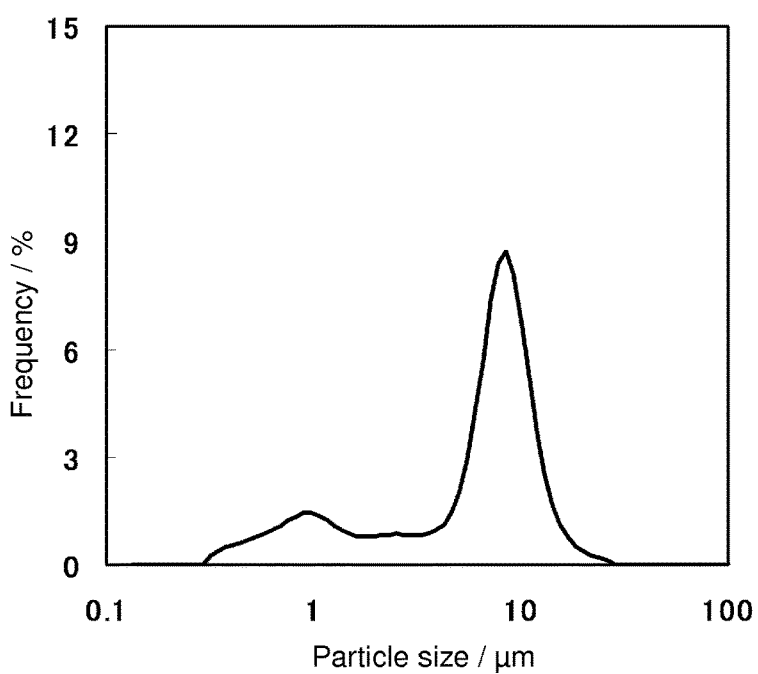
FIG. 5 illustrates a particle size distribution of Mg-substituted trimanganese tetraoxide in Comparative Example 1.

In the XRD diffraction pattern of the Mg-containing manganese oxide in this Comparative Example, in addition to the No. 24-734 XRD pattern of the JCPDS pattern, XRD patterns of layered manganese oxide, etc. were confirmed, and the oxide was found to be a mixture. Of the Mg-containing manganese oxide in this Comparative Example, the evaluation results are shown in Table 1, the XRD pattern is shown in FIG. 1, and the particle size distribution is shown in FIG. 5.

TABLE 1

| | Minimum particle size (μm) | Average particle size (μm) | Standard deviation of particle size (μm) | Coefficient of variation of standard deviation (%) | BET specific surface area (m²/g) | Tap density (g/cm³) | Mn (wt %) | Mg (wt %) | x in $Mg_xMn_{3-x}O_4$ |
|---|---|---|---|---|---|---|---|---|---|
| Ex. 1 | 4.2 | 9.0 | 2.61 | 29 | 4 | 1.1 | 66.6 | 0.23 | 0.02 |
| Ex. 2 | 1.8 | 4.4 | 1.24 | 28 | 5 | 1.1 | 64.8 | 1.30 | 0.13 |
| Ex. 3 | 1.1 | 9.8 | 4.51 | 46 | 4 | 1.1 | 62.0 | 2.20 | 0.22 |
| Ex. 4 | 2.1 | 8.5 | 3.83 | 45 | 4 | 1.1 | 58.9 | 3.40 | 0.35 |
| Ex. 5 | 3.6 | 11.3 | 3.87 | 34 | 0.2 | 2.3 | 68.6 | 0.73 | 0.07 |
| Ex. 6 | 3.6 | 7.7 | 2.33 | 30 | 1.9 | 1.7 | 67.2 | 0.78 | 0.08 |
| Ex. 7 | 3.0 | 9.2 | 4.49 | 49 | 0.5 | 1.9 | 66.8 | 0.96 | 0.10 |
| Ex. 8 | 3.6 | 7.2 | 1.99 | 28 | 0.9 | 1.7 | 64.2 | 2.00 | 0.20 |
| Comp. Ex. 1 | 0.3 | 7.0 | 4.45 | 64 | 7 | 0.6 | 66.6 | 0.03 | — |

Metal-Substituted Lithium Manganese Oxide

Example 9

The Mg-substituted trimanganese tetraoxide in Example 1 and lithium carbonate were mixed in a mortar, and the mixture was fired in a stream of the air at 850° C. for 12 hours, whereby Mg-substituted lithium manganese oxide containing Li, Mg and Mn was obtained.

The crystal phase of the obtained Mg-substituted lithium manganese oxide was a single phase of a spinel structure, and the oxide had a composition of $Li_{1.10}Mg_{0.09}Mn_{1.81}O_4$.

Figure 6:
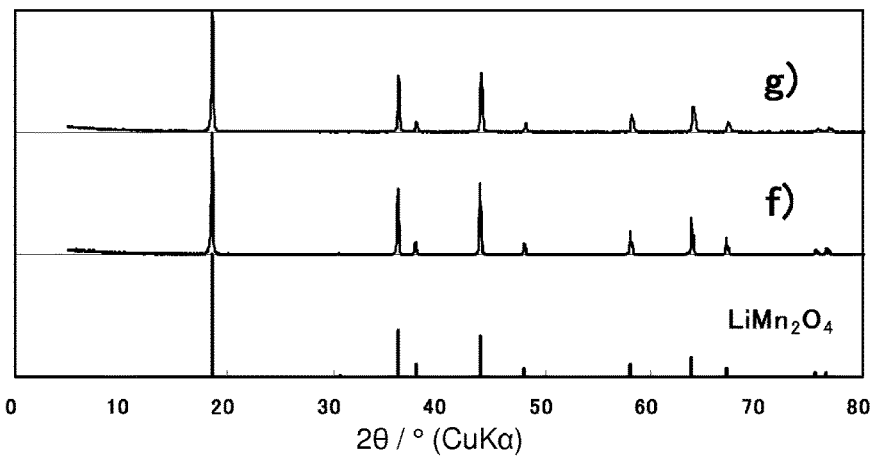
FIG. 6 illustrates powder X-ray diffraction patterns of Mg-substituted lithium manganese oxide in each of Examples 9 and 10. a): Example 9 and b): Example 10.

Of the Mg-substituted lithium manganese oxide in this Example, the evaluation results are shown in Table 2, and the XRD pattern is shown in FIG. 6.

Example 10

Mg-substituted lithium manganese oxide containing Li, Mg and Mn was obtained in the same manner as in Example 9 except that the Mg-substituted trimanganese tetraoxide in Example 2 was used.

The crystal phase of the obtained Mg-substituted lithium manganese oxide was a single phase of a spinel structure, and the oxide had a composition of $Li_{1.10}Mg_{0.09}Mn_{1.81}O_4$.

Of the Mg-substituted lithium manganese oxide in this Example, the evaluation results are shown in Table 2, the XRD pattern is shown in FIG. 6.

TABLE 2

| | Mn (wt %) | Mg (wt %) | Li (wt %) | Compositional formula |
|---|---|---|---|---|
| Ex. 9 | 56.6 | 1.1 | 3.8 | $LiMg_{0.1}Mn_{1.9}O_4$ |
| Ex. 10 | 53.8 | 3.3 | 3.9 | $LiMg_{0.2}Mn_{1.8}O_4$ |

From these results, it was found that a metal-substituted lithium manganese oxide having high crystallinity could be obtained without a by-product phase from the metal-containing trimanganese tetraoxide combined particles of the present invention.

[Production of Particle-Containing Trimanganese Tetraoxide Combined Particles]

Example 11

Manganese sulfate (manufactured by Wako Pure Chemical Industries, Ltd., special grade reagent) was dissolved in pure water to prepare a 2 mol/L manganese sulfate solution. To the obtained manganese sulfate solution, aluminum hydroxide particles having an average particle size of 3 μm were mixed to obtain a material solution. The Al/Mn molar ratio in the material solution was 0.05.

The obtained material solution was added to pure water at 80° C., followed by reaction for 20 hours to obtain a reaction slurry containing particles in which manganese oxide was crystalized on aluminum hydroxide particles. Addition of the material solution was carried out while an oxygen gas was blown into the pure water (reaction slurry) so that the oxidation-reduction potential in the pure water (reaction slurry) would be 100±20 mV and a 2 mol/L sodium hydroxide aqueous solution was added to the pure water (reaction slurry) so that the pH of the pure water (reaction slurry) would be constant at 8.0.

The obtained reaction slurry was subjected to filtration, washed with pure water and dried in the air at 120° C. to obtain combined particles in this Example.

The combined particles in this Example had an Al/Mn molar ratio of 0.03. With respect to the crystal phase of the particles, the same pattern as No. 24-734 XRD pattern of the JCPDS pattern corresponding to a spinel structure and an XRD pattern of aluminum hydroxide were confirmed.

From these results, the combined particles in this Example were found to be trimanganese tetraoxide combined particles comprising aluminum hydroxide and trimanganese tetraoxide. Further, the combined particles had a small amount of impurities with 1.1 wt % of $SO_4$.

Figure 7:
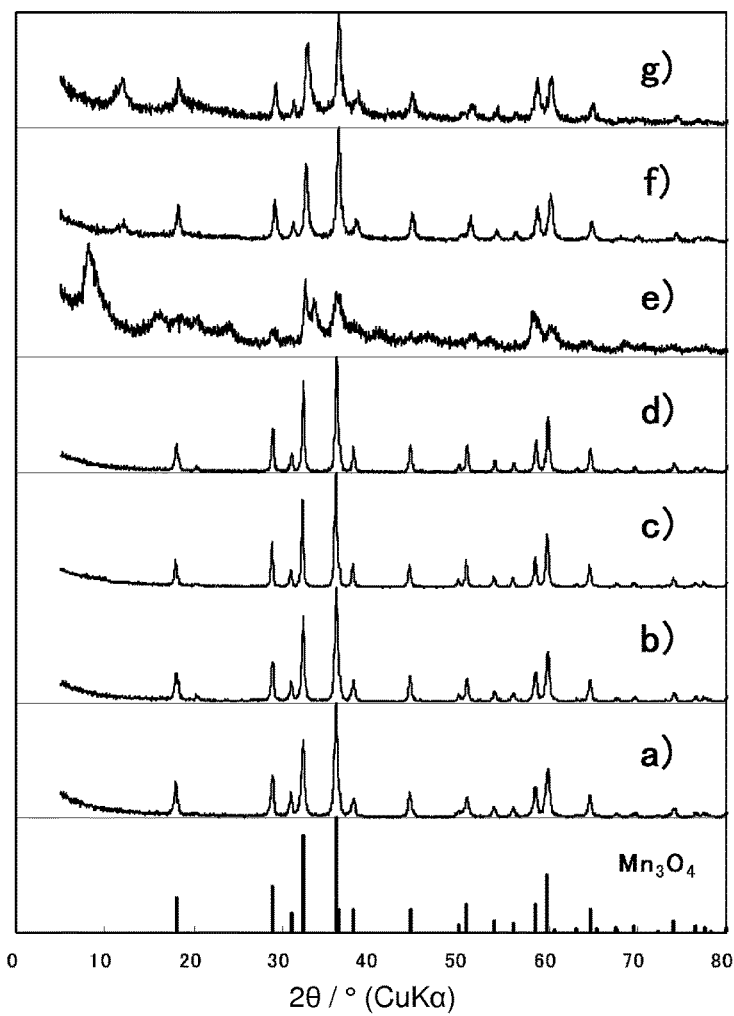
FIG. 7 illustrates powder X-ray diffraction patterns in Examples and Comparative Examples. a): Example 11, b): Example 12, c): Example 13, d): Example 14, e): Example 15, f): Example 16 and g): Example 17.
Figure 8:
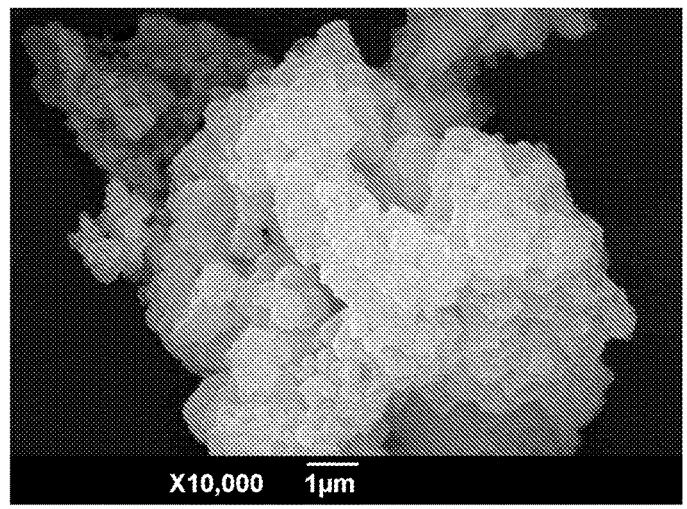
FIG. 8 illustrates a fine structure of trimanganese tetraoxide combined particles in Example 11 (scale: 1 μm).
Figure 9:
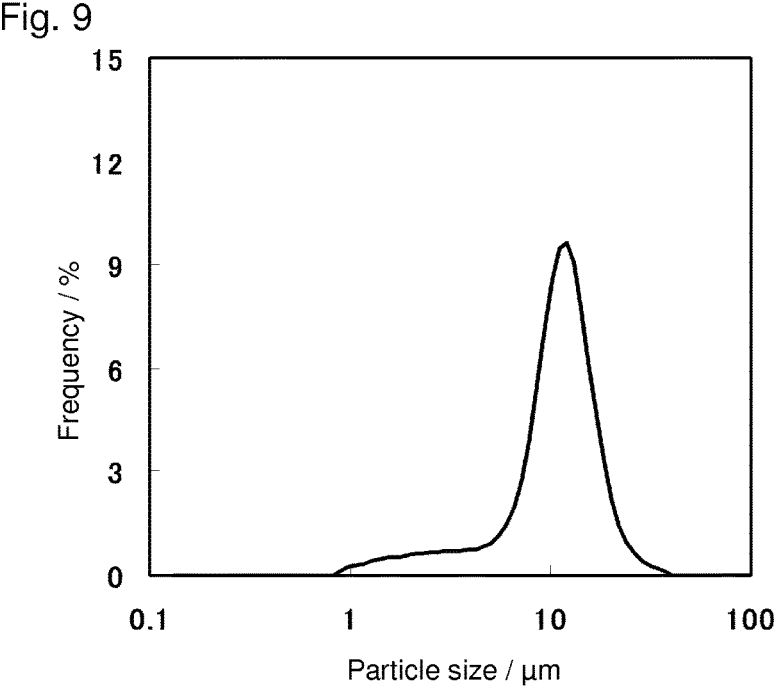
FIG. 9 illustrates a particle size distribution of trimanganese tetraoxide combined particles in Example 11.

Of the trimanganese tetraoxide combined particles in this Example, the evaluation result are shown in Table 3, the results of the XRD measurement are shown in FIG. 7, the results of SEM observation are shown in FIG. 8, and the particle size distribution is shown in FIG. 9.

From the results of the SEM observation, the trimanganese tetraoxide combined particles in this Example constituted secondary particles in which primary particles of trimanganese tetraoxide were strongly agglomerated with aluminum hydroxide particles so that the primary particles included the aluminum hydroxide particles.

Example 12

Combined particles in this Example were obtained in the same manner as in Example 11 except that aluminum hydroxide particles were mixed with the manganese sulfate solution so that the Al/Mn molar ratio would be 0.1.

The combined particles in this Example had an Al/Mn molar ratio of 0.11. With respect to the crystal phase of the combined particles, the same pattern as No. 24-734 XRD pattern of the JCPDS pattern corresponding to the spinel structure and an XRD pattern of aluminum hydroxide were confirmed.

From these results, the combined particles in this Example were found to be trimanganese tetraoxide combined particles comprising aluminum hydroxide and trimanganese tetraoxide. Further, the combined particles had a low $SO_4$ content of 0.8 wt %. Of the trimanganese tetraoxide combined particles in this Example, the evaluation results are shown in Table 3, and the XRD measurement results are shown in FIG. 7.

Example 13

Combined particles were obtained in the same manner as in Example 11 except that the reaction was carried out continuously for 100 hours while the reaction slurry was withdrawn at the same rate as the rate of addition of the material solution.

The combined particles in this Example had an Al/Mn molar ratio of 0.05. With respect to the crystal phase of the particles, the same pattern as the No. 24-734 XRD pattern of the JCPDS pattern corresponding to the spinel structure and a pattern of aluminum hydroxide were confirmed.

From these results, the combined particles in this Example were found to be trimanganese tetraoxide combined particles comprising aluminum hydroxide and trimanganese tetraoxide. Further, the combined particles had a low $SO_4$ content of 0.5 wt %. Of the trimanganese tetraoxide in this Example, the evaluation results are shown in Table 3, and the XRD measurement results are shown in FIG. 7.

Example 14

An oxide in this Example was obtained in the same manner as in Example 13 except that the aluminum hydroxide particles were mixed with the manganese sulfate solution so that the Al/Mn molar ratio would be 0.1.

The combined particles in this Example had an Al/Mn molar ratio of 0.08. With respect to the crystal phase of the particles, the same pattern as the No. 24-734 XRD pattern of the JCPDS pattern corresponding to the spinel structure and an XRD pattern of aluminum hydroxide were confirmed.

From these results, the combined particles in this Example were found to be trimanganese tetraoxide combined particles comprising aluminum hydroxide and trimanganese tetraoxide. Further, the combined particles had a low $SO_4$ content of 0.4 wt %. Of the trimanganese tetraoxide in this Example, the evaluation results are shown in Table 3, and the XRD measurement results are shown in FIG. 7.

Example 15

Manganese sulfate (manufactured by Wako Pure Chemical Industries, Ltd., special grade reagent) and aluminum sulfate (manufactured by Wako Pure Chemical Industries, Ltd., special grade reagent) were dissolved in pure water to obtain a material solution containing 2 mol/L of manganese sulfate and 0.4 mol/L of aluminum sulfate. The Al/Mn molar ratio in the material solution was 0.2.

An oxide was obtained in the same manner as in Example 11 except that the material solution was used.

The oxide in this Example had an Al/Mn molar ratio of 0.3. Further, the oxide was found to have a crystal phase containing a spinel structure and another structure and to be crystals close to amorphous showing broad XRD patterns of these structures.

Accordingly, the oxide in this Example was found to be Al-containing trimanganese tetraoxide. Further, the Al-containing trimanganese tetraoxide had a $SO_4$ content of 1.4 wt %. Of the Al-containing trimanganese tetraoxide in this Example, the evaluation results are shown in Table 3, and the XRD measurement results are shown in FIG. 7.

Example 16

An oxide in this Example was obtained in the same manner as in Example 15 except that a material solution containing 2 mol/L of manganese sulfate and 0.2 mol/L of aluminum sulfate was used. The Al/Mn molar ratio in the material solution was 0.1.

The oxide in this Example had an Al/Mn molar ratio of 0.14. Further, the oxide was found to have a crystal phase containing a spinel structure and another structure and to be crystals close to amorphous showing broad XRD patterns of these structures.

Accordingly, the oxide in this Example was found to be Al-containing trimanganese tetraoxide. Further, the Al-containing trimanganese tetraoxide had a $SO_4$ content of 0.64 wt %.

Further, from the SEM observation image, the Al-containing manganese oxide in this Example was found to be particles having a structure such that hexagonal plate-form crystals were laminated, i.e. particles having a so-called card house structure. Of the Al-containing trimanganese tetraoxide in this Comparative Example, the evaluation results are shown in Table 3, and the XRD measurement results are shown in FIG. 7.

Example 17

An oxide in this Example was obtained in the same manner as in Example 15 except that a material solution containing 2 mol/L of manganese sulfate and 0.4 mol/L of aluminum sulfate was used. The Al/Mn molar ratio in the material solution was 0.1.

The oxide in this Example was Al-containing manganese oxide having an Al/Mn molar ratio of 0.29 and a $SO_4$ content of 11.4 wt %.

As a result of the XRD measurement, the crystal phase of the Al-containing manganese oxide in this Example showed a broad XRD pattern, and the oxide was found to be one close to amorphous containing a spinel structure and another structure.

Figure 10:
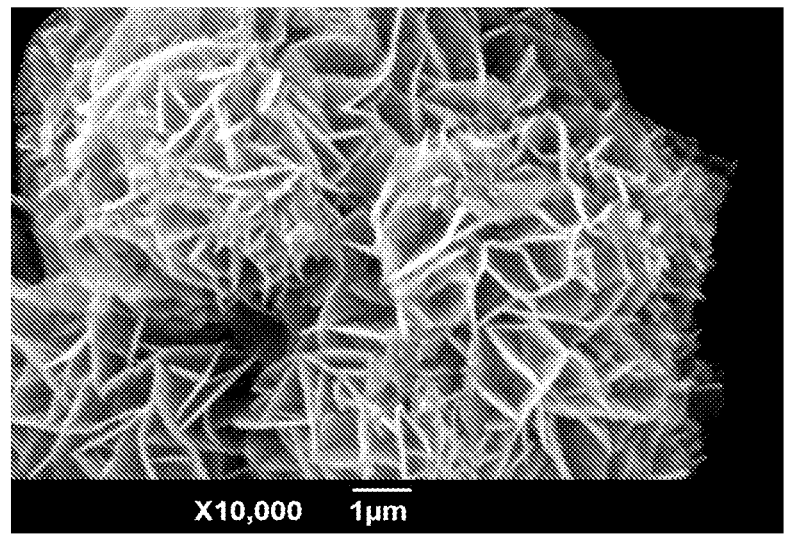
FIG. 10 illustrates a fine structure of Al-containing manganese oxide in Example 17 (scale: 1 μm).
Figure 11:
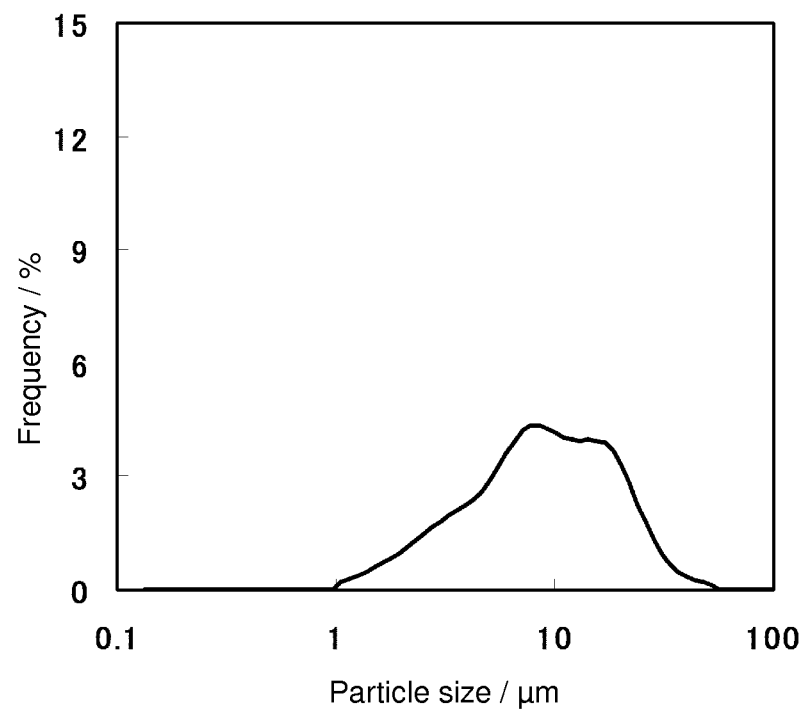
FIG. 11 illustrates a particle size distribution of Al-containing manganese oxide in Example 15.

Further, from the SEM observation image, the Al-containing manganese oxide in this Example was found to be particles having a card house structure. Of the Al-containing manganese oxide in this Example, the evaluation results are shown in Table 3, the XRD measurement results are shown in FIG. 7, and the results of SEM observation are shown in FIG. 10.

TABLE 3

| | Average particle size (μm) | Standard deviation of particle size (μm) | Cv (coefficient of variation of standard deviation) (%) | BET specific surface area (m²/g) | Tap density (g/cm³) | Mn (wt %) | Al (wt %) | Al/Mn (molar ratio) | SO₄ (wt %) |
|---|---|---|---|---|---|---|---|---|---|
| Ex. 11 | 10.7 | 4.4 | 41 | 2.7 | 1.1 | 64.7 | 1.0 | 0.03 | 1.1 |
| Ex. 12 | 9.5 | 4.6 | 48 | 3.8 | 1.0 | 59.9 | 3.1 | 0.11 | 0.8 |
| Ex. 13 | 7.5 | 2.6 | 34 | 1.8 | 1.5 | 64.4 | 1.5 | 0.05 | 0.5 |
| Ex. 14 | 6.8 | 1.9 | 28 | 1.6 | 1.4 | 65.6 | 2.7 | 0.08 | 0.4 |
| Ex. 15 | 8.5 | 7.2 | 84 | 21.7 | 0.6 | 40.2 | 6.0 | 0.30 | 14.0 |
| Ex. 16 | 16.0 | 5.6 | 35 | 16.8 | 0.5 | 53.2 | 3.6 | 0.14 | 6.4 |
| Ex. 17 | 14.5 | 4.0 | 28 | 17.5 | 0.4 | 42.0 | 5.9 | 0.29 | 11.4 |

It was found from these results that the trimanganese tetraoxide combined particles of the present invention not only had high crystallinity but also had a very low SO₄ content as compared with aluminum-substituted trimanganese tetraoxide obtained from a solution containing manganese and aluminum. Further, the trimanganese tetraoxide combined particles of the present invention were found to have a high fillability as compared with Al-containing trimanganese tetraoxide obtained from a solution.

Synthesis of Lithium Manganese Oxide

Example 18

The trimanganese tetraoxide combined particles obtained in Example 11 and lithium carbonate were mixed in a mortar, and the mixture was fired in a stream of the air at 850° C. for 12 hours to obtain composite oxide containing Li, Al and Mn.

The obtained metal-substituted lithium manganese oxide had a single phase of a spinel structure, and had a composition of $Li_{1.04}Al_{0.07}Mn_{1.89}O_4$.

Figure 12:
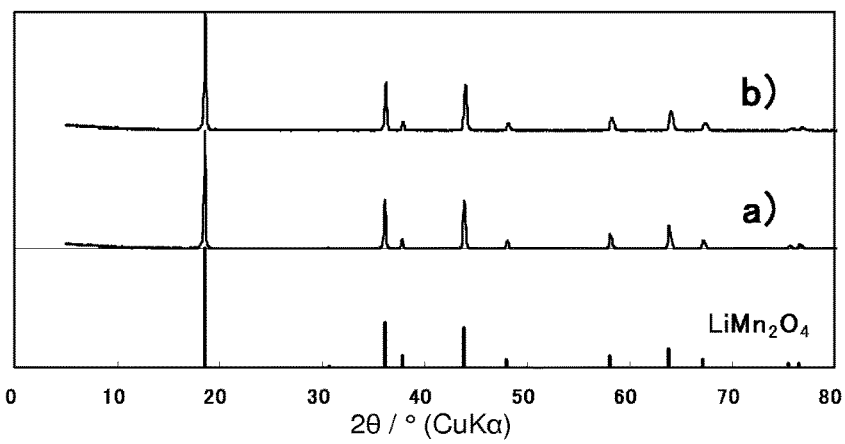
FIG. 12 illustrates powder X-ray diffraction patterns of lithium manganese oxides in Examples 18 and 19. a): Example 18 and b): Example 19.

Of the obtained metal-substituted lithium manganese oxide, the results of compositional analysis are shown in Table 4, and the XRD pattern is shown in FIG. 12.

Example 19

A metal-substituted lithium manganese oxide was obtained in the same manner as in Example 18 except that the trimanganese tetraoxide combined particles obtained in Example 12 were used.

The obtained metal-substituted lithium manganese oxide had a single phase of a spinel structure, and had a composition of $Li_{1.02}Al_{0.19}Mn_{1.79}O_4$.

Of the obtained metal-substituted lithium manganese oxide, the results of compositional analysis are shown in Table 4, and the XRD pattern is shown in FIG. 12.

TABLE 4

| | Mn (wt %) | Al (wt %) | Li (wt %) | Compositional formula |
|---|---|---|---|---|
| Ex. 18 | 57.7 | 0.99 | 4.0 | $Li_{1.04}Al_{0.07}Mn_{1.89}O_4$ |
| Ex. 19 | 54.3 | 2.90 | 3.9 | $Li_{1.02}Al_{0.19}Mn_{1.79}O_4$ |

Example 20

Production of Trimanganese Tetraoxide-Covered Combined Particles

Nickel sulfate (manufactured by Wako Pure Chemical Industries, Ltd., special grade reagent) and cobalt sulfate (manufactured by Wako Pure Chemical Industries, Ltd., special grade reagent) were dissolved in pure water to prepare a material solution containing 2 mol/L of nickel sulfate and 2 mol/L of cobalt sulfate. The Ni/Co molar ratio in the material solution was 1.

67.3 g of the obtained material solution was added to pure water at 80° C. to precipitate a co-precipitated compound to obtain a reaction slurry. Addition of the material solution was carried out while a 2 mol/L sodium hydroxide aqueous solution was added to the pure water (reaction slurry) so that the pH of the pure water (reaction slurry) would be 8.0. After addition of the material solution, stirring of the reaction slurry was carried out for one hour, whereby 99.9% of nickel and cobalt in the material solution were precipitated as a co-precipitated compound.

Part of the reaction slurry was collected, subjected to filtration, washed and dried to obtain a dry powder of the coprecipitated compound. The obtained dry powder was found to be nickel cobalt composite hydroxide having a composition of Ni/Co molar ratio of 1:1, having a layered structure (space group: P-31 m) as the crystal structure and being represented by $Ni_{0.5}Co_{0.5}(OH)_2$. Further, as a result of SEM observation, the composite oxide was found to be such that plate-form particles were agglomerated to form particles.

On the other hand, 32.8 g of a 2 mol/L manganese sulfate aqueous solution was added to the reaction slurry containing the nickel cobalt composite hydroxide after stirring to obtain a composite co-precipitate. Addition of the manganese sulfate aqueous solution was carried out while an oxygen gas was blown into the reaction slurry so that the oxidation-reduction potential in the reaction slurry would be 100±20 mV, and a 2 mol/L sodium hydroxide aqueous solution was added to the reaction slurry so that the pH of the reaction slurry would be constant at 7.0.

After addition of the manganese sulfate solution, the reaction slurry was stirred for one hour, and then the reaction slurry was subjected to filtration and washed, and the obtained composite co-precipitate was dried at 110° C. to obtain composite metal compound combined particles in this Example.

The composite metal compound combined particles in this Example contained as metal elements 21.1 wt % of Ni, 21.2 wt % of Co and 20.3 wt % of Mn, and had a Ni/Co/Mn molar ratio of 1.0/1.0/1.0.

Further, the crystal phase of the composite metal compound combined particles was found to be a mixed phase of trimanganese tetraoxide (Hausmannite, space group: I41/amd) and nickel cobalt composite hydroxide (layered structure, space group: P-3m1).

Further, as a result of SEM observation, irregular particles were confirmed on the plate-form nickel cobalt complex hydroxide. Further, manganese hydroxide and trimanganese tetraoxide in the hexagonal plate-form shape derived therefrom could not be confirmed. Accordingly, it was confirmed that trimanganese tetraoxide in this Example was crystalized not by means of manganese hydroxide. From these results, the composite metal compound in this Example was confirmed to be trimanganese tetraoxide-covered nickel cobalt composite hydroxide having $Mn_3O_4$ precipitated on $Ni_{0.5}Co_{0.5}(OH)_2$.

Figure 13:
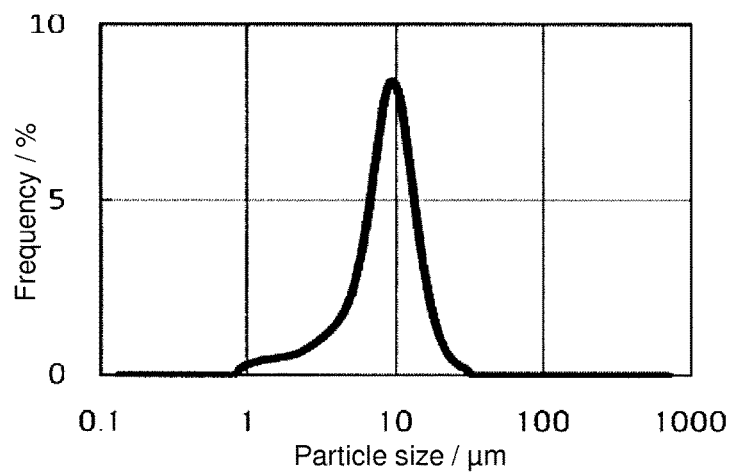
FIG. 13 illustrates a particle size distribution of trimanganese tetraoxide-covered nickel-cobalt composite hydroxide in Example 20.
Figure 14:
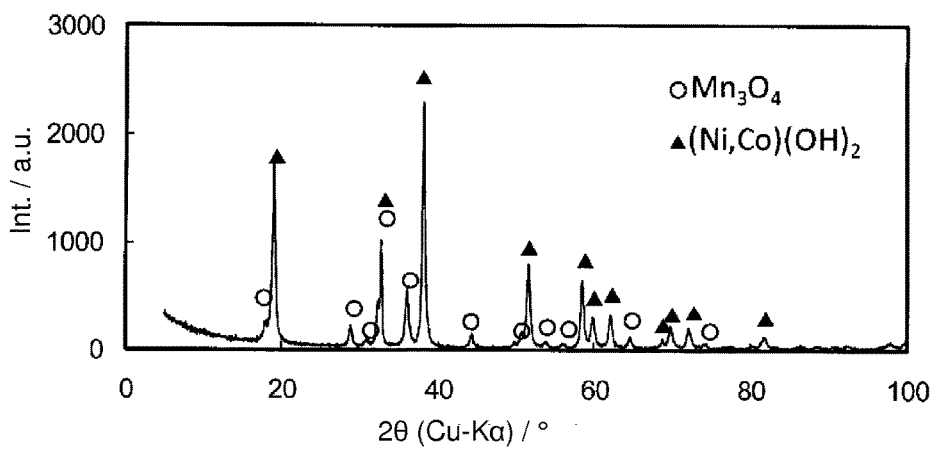
FIG. 14 illustrates a powder X-ray diffraction pattern of trimanganese tetraoxide-covered nickel-cobalt composite hydroxide in Example 20.
Figure 15:
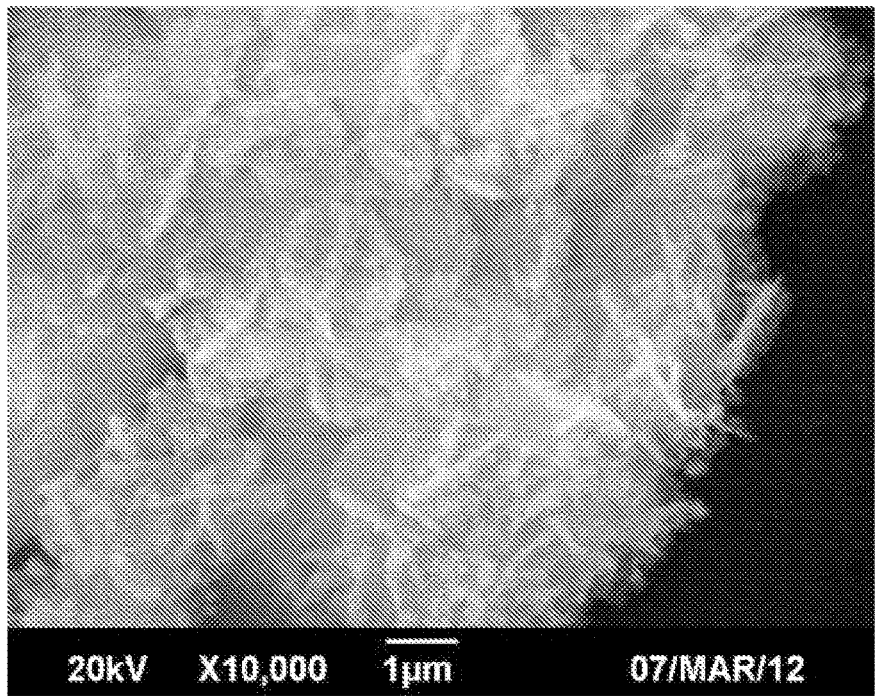
FIG. 15 illustrates SEM observation results of trimanganese tetraoxide-covered nickel-cobalt composite hydroxide in Example 20 (scale: 1 μm).

Of the trimanganese tetraoxide-covered nickel cobalt composite hydroxide in this Example, the evaluation results are shown in Table 5, the particle size distribution is shown in FIG. 13, the XRD pattern is shown in FIG. 14, and the SEM observation results are shown in FIG. 15.

Figure 16:
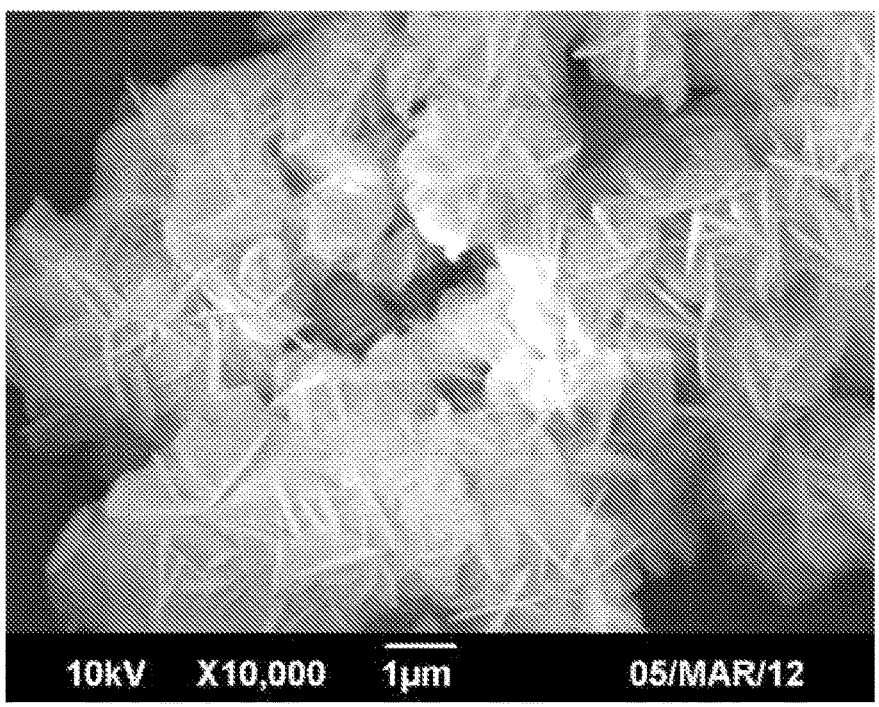
FIG. 16 illustrates SEM observation results of nickel-cobalt composite hydroxide obtained in Example 20 (scale: 1 μm).

Further, of the nickel cobalt composite hydroxide obtained in this Example, the SEM observation results are shown in FIG. 16.

TABLE 5

| | Chemical composition (wt %) | | | | Average particle size (μm) | BET specific surface area (m²/g) |
|---|---|---|---|---|---|---|
| | Ni | Co | Mn | Crystal phase | | |
| Ex. 20 | 21.1 | 21.2 | 20.3 | (Ni, Co)(OH)$_2$ Layered, space group: P-3m1 Mn$_3$O$_4$ Hausmannite | 8.5 | 18.8 |

[Production of Lithium Composite Oxide]

The obtained trimanganese tetraoxide-covered nickel cobalt composite hydroxide and lithium carbonate having an average particle size of 0.3 μm were mixed so that the Li/(Ni+Co+Mn) molar ratio=1.05, and the mixture was fired in the air at 900° C. for 24 hours to obtain lithium composite oxide.

The obtained lithium composite oxide had a composition of $Li_{1.03}Ni_{0.33}Co_{0.33}Mn_{0.34}O_{2.0}$, had a single phase of a layered rock salt type structure (space group: R-3m) as the crystal phase and had a tap density of 2.0 g/cm³.

Figure 17:
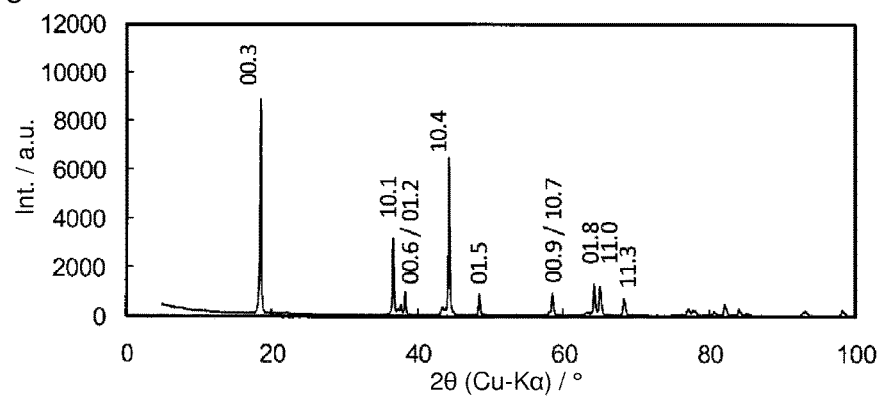
FIG. 17 illustrates a powder X-ray diffraction pattern of a lithium composite oxide in Example 20.

As a result of evaluation of the battery performances of the obtained lithium composite oxide, the initial discharge capacity was 158.5 mAh/g, and the 10th discharge capacity was 156.9 mAh/g. The capacity ratio of the 10th discharge capacity to the initial discharge capacity was 99.0%. Of the lithium composite oxide in this Example, the evaluation results are shown in Table 6, and the XRD pattern is shown in FIG. 17.

Comparative Example 2

A $Mn_3O_4$ powder (Brownox, tradename, manufactured by TOSOH CORPORATION), the nickel cobalt composite hydroxide obtained in Example 20 and lithium carbonate were mixed so that the Li/(Ni+Co)/Mn molar ratio=1.05/(0.33+0.33)/0.34, and the mixture was fired in the air at 900° C. for 24 hours to obtain lithium composite oxide.

The obtained lithium composite oxide had a composition of $Li_{1.03}Ni_{0.33}Co_{0.33}Mn_{0.34}Ox$. Further, the lithium composite oxide had a layered rock salt type structure (space group: R-3m) as the crystal phase, but was a mixture containing $Li_2MnO_3$ (space group: C2/m) and NiO.

As a result of evaluation of the battery performances of the obtained lithium composite oxide, the initial discharge capacity was 126.0 mAh/g, and the 10th discharge capacity was 70.7 mAh/g. The capacity ratio of the 10th discharge capacity to the initial discharge capacity was 56.1%.

Of the lithium composite oxide in this Comparative Example, the evaluation results are shown in Table 6.

Comparative Example 3

Nickel chloride (manufactured by Wako Pure Chemical Industries, Ltd., special grade reagent), cobalt chloride (manufactured by Wako Pure Chemical Industries, Ltd., special grade reagent) and manganese chloride (manufactured by Wako Pure Chemical Industries, Ltd., special grade reagent) were dissolved in pure water to obtain a material solution containing 0.5 mol/L of nickel chloride, 0.5 mol/L of cobalt chloride and 0.5 mol/L of manganese chloride.

The obtained material solution was added to pure water at 60° C., whereby a reaction slurry having co-precipitated hydroxide precipitated was obtained. Addition of the material solution was carried out while a 3 mol/L sodium hydroxide aqueous solution was added to the pure water (reaction slurry) so that the pH of the pure water (reaction slurry) would be constant at 9.0.

The obtained co-precipitated compound slurry was subjected to filtration, washed with pure water and dried to obtain a co-precipitated compound in this Comparative Example.

The obtained co-precipitated compound had a composition of Ni:Co:Mn molar ratio=1:1:1, and had a layered structure as the crystal phase. From these results, the co-precipitated compound was found to be nickel-cobalt-manganese composite hydroxide represented by $Ni_{1/3}Co_{1/3}Mn_{1/3}(OH)_2$. The particle size distribution curve showed a sharp single peak, and the average particle size was 8.5 μm. Of the nickel-cobalt-manganese composite hydroxide in this Comparative Example, the evaluation results are shown in Table 6.

[Production of Lithium Composite Oxide]

The obtained nickel-cobalt-manganese composite hydroxide and lithium carbonate were mixed so that the Li/(Ni+Co+Mn) molar ratio=1.05/1, and the mixture was fired in the air at 900° C. for 12 hours to obtain lithium composite oxide.

The obtained lithium composite oxide had a composition of $Li_{1.04}[Ni_{0.33}Mn_{0.34}Co_{0.33}]O_2$. Further, the lithium composite oxide was found to have a layered rock salt structure (space group: R-3m) as the crystal phase. Further, the particle size distribution was broad, and the tap density was 2.84 g/cm³.

As a result of evaluation of the battery performance of the obtained lithium composite oxide, the initial discharge capacity was 150.0 mAh/g, and the 10th discharge capacity was 148.0 mAh/g. The capacity ratio of the 10th discharge capacity to the initial discharge capacity was 98.7%.

Of the lithium composite oxide in this Comparative Example, the evaluation results are shown in Table 6.

TABLE 6

| | Initial discharge capacity (mAh/g) | 10th Discharge capacity (mAh/g) | Discharge capacity ratio (%) 10th/initial |
|---|---|---|---|
| Ex. 20 | 158.5 | 156.9 | 99.0 |
| Comp. Ex. 2 | 126.0 | 70.7 | 56.1 |
| Comp. Ex. 3 | 150.0 | 148.5 | 98.5 |

From the results in Examples and Comparative Examples, the lithium composite oxide obtained by using the trimanganese tetraoxide-covered combined particles of the present invention showed a long charge and discharge cycle life as compared with lithium composite oxide obtained by a dry mixing method or a co-precipitation method. Further, the lithium composite oxide in Examples of the present invention showed a larger initial discharge capacity than that of the lithium composite oxide in Comparative Example 3. Accordingly, it was found that the lithium composite oxide obtained by using the trimanganese tetraoxide-covered combined particles of the present invention provided not only a long charge and discharge cycle life but also a large discharge capacity.

Example 21

Production of Metal-Covered Trimanganese Tetraoxide Combined Particles

Manganese sulfate (manufactured by Wako Pure Chemical Industries, Ltd., special grade reagent) was dissolved in pure water to obtain a material solution containing 2 mol/L of manganese sulfate.

The obtained material solution was added to pure water at 80° C., whereby a reaction slurry having manganese oxide crystalized was obtained. Addition of the material solution was carried out while the air was blown so that the oxidation-reduction potential of the reaction slurry would be 100 mV, and a 2 mol/L sodium hydroxide aqueous solution was added so that the pH of the reaction slurry would be constant at 8.0. After addition of the material solution, the reaction slurry was stirred for one hour.

After stirring, part of the reaction slurry was collected, subjected to filtration, washed and dried to obtain manganese oxide. The obtained manganese oxide showed the same pattern as No. 24-734 X-ray diffraction pattern of the JCPDS pattern corresponding to a spinel structure, and had a composition of MnOx wherein x=1.33. Accordingly, the manganese oxide was found to be trimanganese tetraoxide.

Then, nickel sulfate (manufactured by Wako Pure Chemical Industries, Ltd., special grade reagent) and cobalt sulfate (manufactured by Wako Pure Chemical Industries, Ltd., special grade reagent) were dissolved in pure water to prepare a composite material solution containing 2 mol/L of nickel sulfate and 2 mol/L of cobalt sulfate. The Ni/Co molar ratio in the composite material solution was 1.

67.2 g of the composite material solution was added to the reaction slurry containing trimanganese tetraoxide after stirring, to obtain combined particles. Addition of the composite material solution was carried out while a 2 mol/L sodium hydroxide aqueous solution was added to the reaction slurry so that the pH of the reaction slurry would be constant at 7.5.

After addition of the composite material solution, the reaction slurry was stirred for one hour, subjected to filtration and washed, and the obtained combined particles were dried at 110° C. to obtain metal-covered trimanganese tetraoxide combined particles in this Example.

The metal-covered trimanganese tetraoxide combined particles in this Example contained as metal elements 21.1 wt % of Ni, 21.6 wt % of Co and 20.4 wt % of Mn and had a Ni/Co/Mn molar ratio=1.0/1.0/1.0.

Further, the metal-covered trimanganese tetraoxide combined particles had crystal phases of trimanganese tetraoxide (Hausmannite, space group: I41/amd) and nickel cobalt composite hydroxide (layered structure, space group: P-3m1).

From these results, the metal-covered trimanganese tetraoxide combined particles in this Example were found to be nickel-cobalt hydroxide-covered trimanganese tetraoxide combined particles comprising $Ni_{0.5}Co_{0.5}(OH)_2$ and $Mn_3O_4$.

Figure 18:
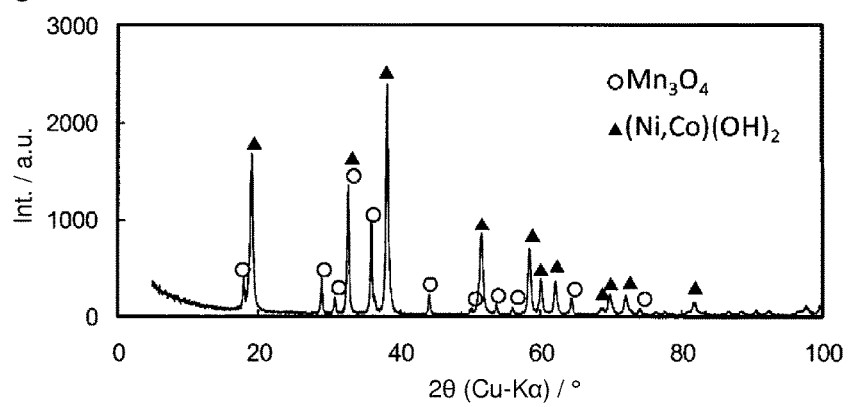
FIG. 18 illustrates a powder X-ray diffraction pattern of nickel-cobalt hydroxide-covered trimanganese tetraoxide combined particles in Example 21.
Figure 19:
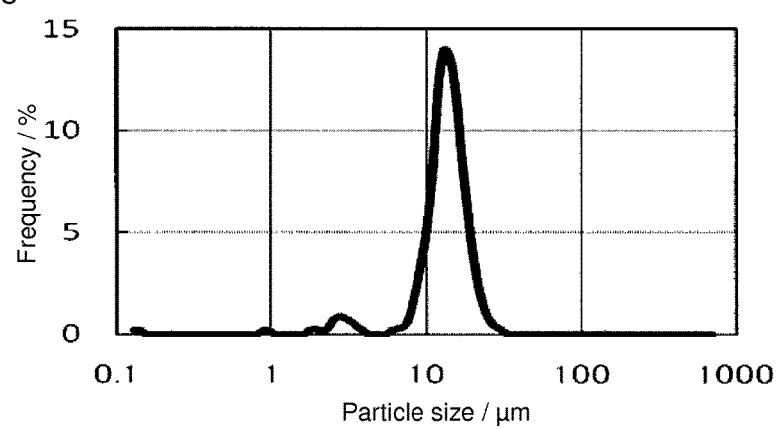
FIG. 19 illustrates a particle size distribution of nickel-cobalt hydroxide-covered trimanganese tetraoxide combined particles in Example 21.
Figure 20:
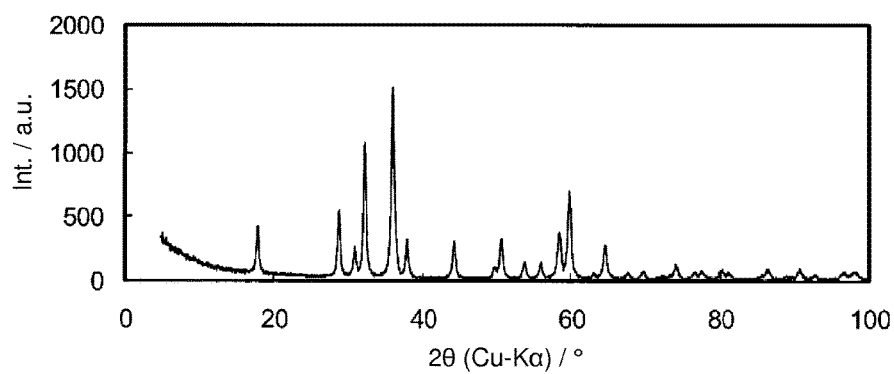
FIG. 20 illustrates a powder X-ray diffraction pattern of trimanganese tetraoxide in Example 21.

Of the nickel-cobalt hydroxide-covered trimanganese tetraoxide combined particles in this Example, the evaluation results are shown in Table 7, the XRD pattern is shown in FIG. 18, and the particle size distribution is shown in FIG. 19. Further, the XRD pattern of trimanganese tetraoxide obtained in Example 21 is shown in FIG. 20.

TABLE 7

| | Chemical composition (wt %) | | | | Average particle size | BET specific surface area |
|---|---|---|---|---|---|---|
| | Ni | Co | Mn | Crystal phase | (μm) | (m²/g) |
| Ex. 21 | 21.1 | 21.6 | 20.4 | $(Ni, Co)(OH)_2$ Layered, space group: P-3m1 $Mn_3O_4$ Hausmannite | 13.0 | 14.3 |

[Production of Lithium Composite Oxide]

The obtained nickel-cobalt hydroxide-covered trimanganese tetraoxide combined particles and lithium carbonate having an average particle size of 0.3 μm were mixed so that the Li/(Ni+Co+Mn) molar ratio=1.05, and the mixture was fired in the air at 900° C. for 24 hours to obtain a lithium composite oxide.

The obtained lithium composite oxide had a composition of $Li_{1.04}Ni_{0.33}Co_{0.33}Mn_{0.34}O_{2.0}$ and had a single phase of the layered rock salt type structure (space group: R-3m) as the crystal phase.

As a result of evaluation of the battery performances of the obtained lithium composite oxide, the initial discharge capacity was 150.0 mAh/g, and the 10th discharge capacity was 148.5 mAh/g. The capacity ratio of the 10th discharge capacity to the initial discharge capacity was 99.0%.

Figure 21:
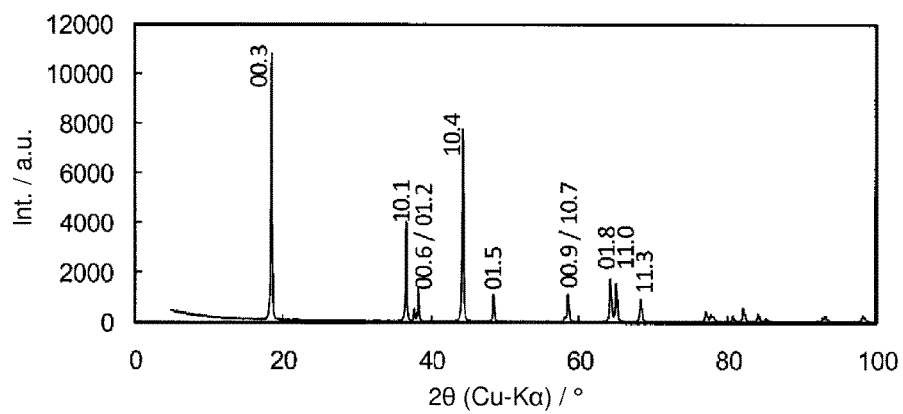
FIG. 21 illustrates a powder X-ray diffraction pattern of a lithium composite oxide in Example 21.

The evaluation results of the lithium composite oxide in this Example, and in Comparative Examples 2 and 3, are shown in Table 8, and the XRD pattern of the lithium composite oxide in this Example is shown in FIG. 21.

TABLE 8

| | Initial discharge capacity (mAh/g) | 10th Discharge capacity (mAh/g) | Discharge capacity ratio (%) 10th/initial |
|---|---|---|---|
| Ex. 21 | 150.0 | 148.5 | 99.0 |
| Comp. Ex. 2 | 126.0 | 70.7 | 56.1 |
| Comp. Ex. 3 | 150.0 | 148.0 | 98.7 |

From the results in Examples and Comparative Examples, lithium composite oxide obtained by using the trimanganese tetraoxide combined particles of the present invention provided not only a large initial discharge capacity but also a long charge and discharge cycle life as compared with lithium composite oxide obtained by solid phase mixing or by a co-precipitation method.

INDUSTRIAL APPLICABILITY

The metal-containing trimanganese tetraoxide combined particles of the present invention can be used as a material of lithium composite oxide particularly metal-substituted lithium manganese oxide as a cathode active material for a lithium secondary battery.

The entire disclosures of Japanese Patent Application No. 2012-086903 filed on Apr. 5, 2012, Japanese Patent Application No. 2012-086904 filed on Apr. 5, 2012, Japanese Patent Application No. 2012-086905 filed on Apr. 5, 2012 and Japanese Patent Application No. 2012-086906 filed on Apr. 5, 2012 including specifications, claims, drawings and summaries are incorporated herein by reference in their entireties.

The invention claimed is:

1. Metal-containing trimanganese tetraoxide combined particles containing a metal element, said metal element being one other than lithium or manganese,
wherein
said particles are particles in which manganese in the crystal structure of trimanganese tetraoxide is substituted by the metal element;
said particles are continuously produced by a process comprising crystallizing trimanganese tetraoxide at a temperature of at least 60° C. and at most 95° C. from a manganese salt aqueous solution containing manganese ions and a metal element other than manganese and lithium, wherein the crystallizing is in the absence of a complexing agent and:
  a) is not by a hydroxide of manganese, or
  b) is under conditions where crystal growth of a hydroxide of manganese is suppressed;
said particles have an average particle size from 3 μm to 30 μm;
the coefficient of variation of the standard deviation of the particle size is at most 50%;
said particles have a tap density of at least 1.1 g/cm³; and
said particles have a BET specific surface area of at most 2 m²/g.

2. The metal-containing trimanganese tetraoxide combined particles according to claim 1, wherein the metal element is at least one member selected from the group consisting of Mg, Al, Si, Ca, Ti, V, Cr, Co, Ni, Cu, Zn, Ga, Ge, Y, Zr, Nb, Mo, Ag, In and Sn.

3. The metal-containing trimanganese tetraoxide combined particles according to claim 1, wherein the metal element is at least one of Al and Mg.

4. The metal-containing trimanganese tetraoxide combined particles according to claim 1 which are represented by the following formula (1):

$$A_xMn_{3-x}O_4 \tag{1}$$

wherein A is the metal element excluding lithium and manganese, and x is at most 1.

5. The metal-containing trimanganese tetraoxide combined particles according to claim 1, wherein the tap density is at least 1.5 g/cm³.

6. The metal-containing trimanganese tetraoxide combined particles according to claim 1, wherein a hydroxide of manganese comprises manganese hydroxide and/or metal-containing manganese hydroxide.

7. The metal-containing trimanganese tetraoxide combined particles according to claim 1, wherein the crystallizing excludes precipitating a hydroxide of manganese at a pH greater than 9.

8. The metal-containing trimanganese tetraoxide combined particles according to claim 1, wherein crystallizing trimanganese tetraoxide occurs at a pH from 6 to 9.

9. The metal-containing trimanganese tetraoxide combined particles according to claim 1, wherein the not by a hydroxide of manganese excludes crystallizing an oxide of manganese and wherein the process further excludes oxidizing the hydroxide of manganese by an oxidizing agent to produce a metal-containing trimanganese tetraoxide.

10. The metal-containing trimanganese tetraoxide combined particles according to claim 1, wherein the conditions where crystal growth of a hydroxide of manganese is suppressed comprises precipitating fine crystals of hydroxide of trimanganese and oxidization to trimanganese tetraoxide, and wherein fine crystals of hydroxide of trimanganese excludes hexagonal plate-form crystals of a hydroxide of trimanganese.

11. A lithium manganese oxide, which is obtained from the metal-containing trimanganese tetraoxide combined particles as defined claim 1.

12. A cathode active material, which comprises the lithium manganese oxide as defined in claim 11.

13. A process for producing the metal-containing trimanganese tetraoxide combined particles as defined in claim 1, the process comprising crystallizing the metal-substituted trimanganese tetraoxide under conditions which satisfy at least one of a pH of at least 6 and at most 9 and an oxidation-reduction potential of at least 0 mV and at most 300 mV.

14. A process for producing the metal-containing trimanganese tetraoxide combined particles as defined in claim 1, the process comprising blowing an oxygen-containing gas into the manganese salt aqueous solution.

15. A process for producing a metal-substituted lithium manganese oxide, which comprises mixing the metal-containing trimanganese tetraoxide combined particles as defined in claim 1 with a lithium compound, and subjecting the mixture to heat treatment.

16. Metal-containing trimanganese tetraoxide combined particles comprising crystalline trimanganese tetraoxide in which some of the manganese in the crystal structure of trimanganese tetraoxide is substituted by a metal element other than lithium or manganese;
wherein said particles:
  have a have a tap density of at least 1.1 g/cm³,
  have an average particle size from 3 μm to 30 μm,
  have a BET specific surface area of at most 2 m²/g,
  vary in size such that the coefficient of variation of the standard deviation of the particle size is at most 50%, and
  are continuously produced by a process comprising crystallizing trimanganese tetraoxide at a temperature of at least 60° C. and at most 95° C. at a pH from 6 to 9 from a manganese salt aqueous solution containing manganese ions and a metal element other than manganese and lithium, wherein crystallizing trimanganese tetraoxide occurs:
    in the absence of a complexing agent; and
    in the absence of the formation of hexagonal plate-form crystals of manganese hydroxide and/or a metal-containing manganese hydroxide.

17. The metal-containing trimanganese tetraoxide combined particles according to claim 16 which are represented by the following formula (1):

$$A_xMn_{3-x}O_4 \tag{1}$$

wherein A is the metal element excluding lithium and manganese, and x is at most 1.

18. The metal-containing trimanganese tetraoxide combined particles according to claim 16, wherein the metal element is at least one metal element selected from Mg, Al, Si, Ca, Ti, V, Cr, Co, Ni, Cu, Zn, Ga, Ge, Y, Zr, Nb, Mo, Ag, In and Sn.

19. The metal-containing trimanganese tetraoxide combined particles according to claim 16, wherein the continuously produced by a process excludes crystallizing a hydroxide of manganese and then oxidizing the hydroxide of manganese by an oxidizing agent to produce a metal-containing trimanganese tetraoxide.

* * * * *

UNITED STATES PATENT AND TRADEMARK OFFICE
CERTIFICATE OF CORRECTION

PATENT NO. : 10,109,857 B2
APPLICATION NO. : 14/389536
DATED : October 23, 2018
INVENTOR(S) : E. Iwata et al.

Page 1 of 1

It is certified that error appears in the above-identified patent and that said Letters Patent is hereby corrected as shown below:

On the Title Page

On Page 2/other publications (Line 49), please change "english" to -- English --.

In the Claims

At Column 32, Line 34 (Claim 16, Line 7), please change "have a have a" to -- have a --.

Signed and Sealed this
Twenty-eighth Day of May, 2019

Andrei Iancu
*Director of the United States Patent and Trademark Office*